(12) United States Patent
Moretti et al.

(10) Patent No.: US 7,973,645 B1
(45) Date of Patent: Jul. 5, 2011

(54) RFID READER DEVICES AND METHODS THEREOF

(75) Inventors: Vincent C. Moretti, Kenmore, WA (US); Mendy M. Ouzillou, Seattle, WA (US); Michael H. Thomas, Seattle, WA (US); Omer Onen, Redmond, WA (US); Ronald A. Oliver, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 1075 days.

(21) Appl. No.: 11/807,115

(22) Filed: May 25, 2007

(51) Int. Cl.
*H04Q 5/22* (2006.01)
(52) U.S. Cl. .................. 340/10.1; 340/572.2; 340/572.7
(58) Field of Classification Search ............... 340/572.7, 340/572.2, 10.1
See application file for complete search history.

(56) References Cited

U.S. PATENT DOCUMENTS

| 4,201,960 | A * | 5/1980 | Skutta et al. ................. 333/17.3 |
| 6,982,646 | B2 * | 1/2006 | Rodgers et al. ............ 340/572.7 |
| 7,224,985 | B2 * | 5/2007 | Caci ........................... 455/456.1 |

OTHER PUBLICATIONS

Skyworks Solutions Inc., Preliminary Specification Sheet for PHEMT GaAs IC SPDT Switch 0.1-3 GHz, AS213-92; www.skyworksinc.com, 2004.
Agilent Technologies, Applications of PIN Diodes, Application Note 922, 1999, www.semiconductor,agilent.com.

* cited by examiner

*Primary Examiner* — Daniel Wu
*Assistant Examiner* — Frederick Ott
(74) *Attorney, Agent, or Firm* — Turk IP Law, LLC

(57) ABSTRACT

Radio frequency identification (RFID) reader devices are disclosed. An RFID reader device of one aspect may include a radio frequency (RF) output port operable to allow a plurality of RFID antenna modules to be coupled with the RFID reader device. An RF signal generator of the device may be coupled with the RF output port. The RF signal generator may be operable to generate an RF signal and provide the RF signal to the RF output port. A select signal generator of the device may be operable to generate a select signal. The select signal may be operable to be output to select one or more of the plurality of RFID antenna modules.

14 Claims, 17 Drawing Sheets

*RFID ANTENNA MODULES COUPLED IN DAISY-CHAIN CONFIGURATION*

100

*RFID SYSTEM*

201

*RFID READER SYSTEM*

*RFID ANTENNA MODULES
COUPLED IN DAISY-CHAIN CONFIGURATION*

*METHOD PERFORMED BY RFID READER DEVICE*

*RFID ANTENNA MODULES
COUPLED IN BRANCHED CONFIGURATION*

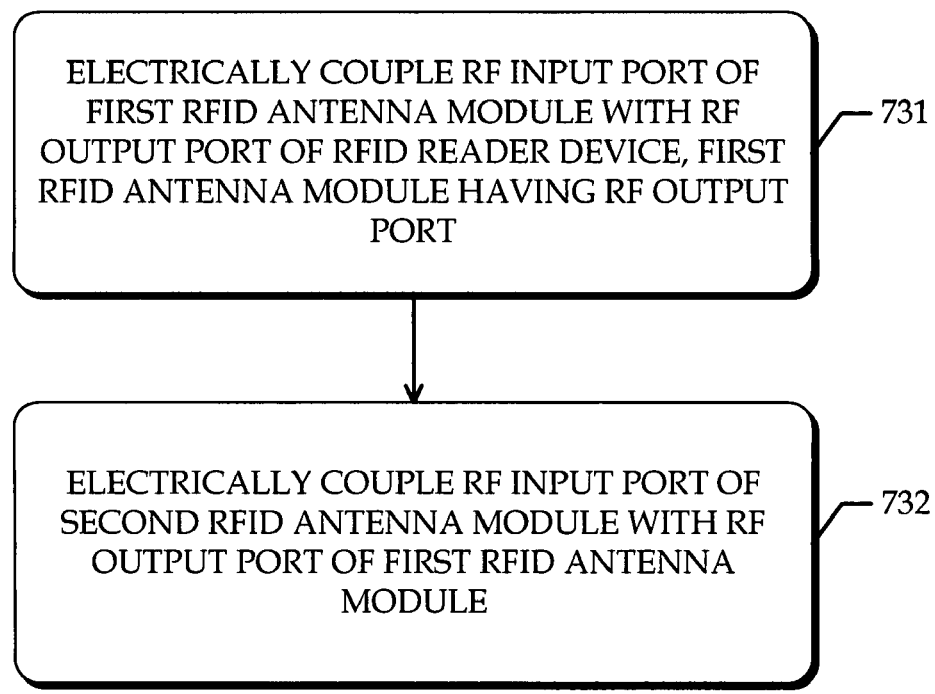
FIG. 7 — *METHOD OF ASSEMBLING RFID READER SYSTEM*
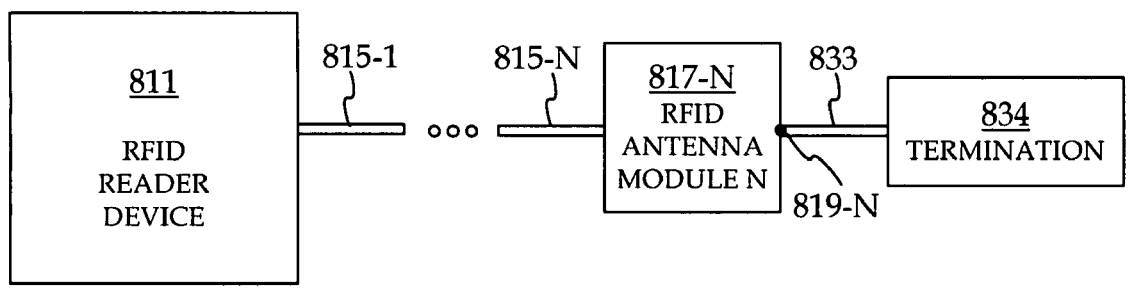
FIG. 8 — *OPTIONAL RF-TERMINATION SCHEME*

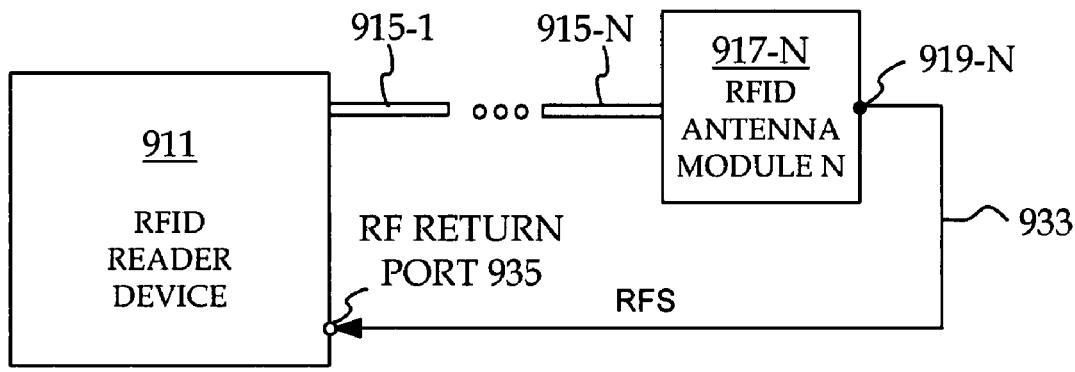
FIG. 9   *OPTIONAL RF-TERMINATION SCHEME*
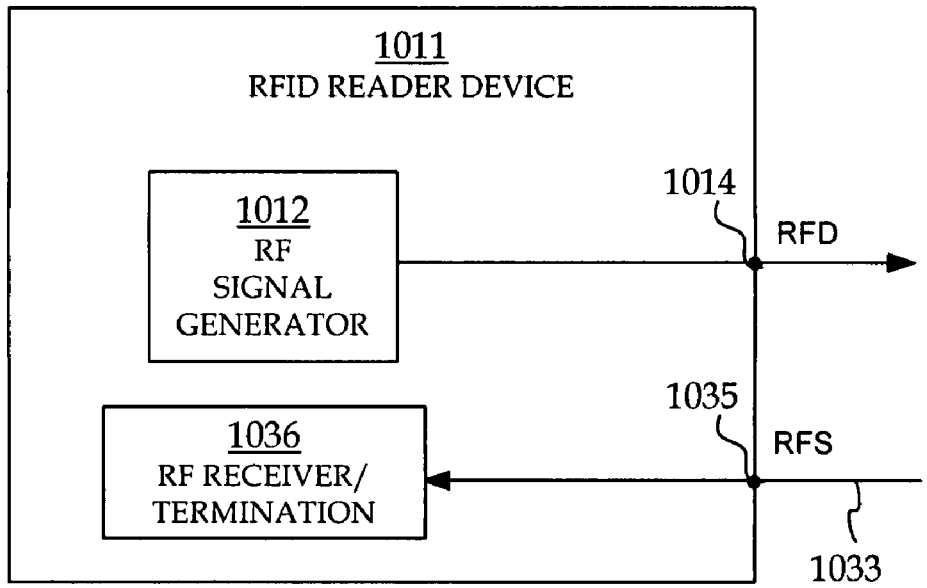
*RFID READER DEVICE ARCHITECTURE*
FIG. 10

*RFID READER DEVICE FOR SEPARATED SIGNALS*

*RFID READER DEVICE FOR COMBINED SIGNALS*

*EXAMPLE SIGNAL COMBINER*

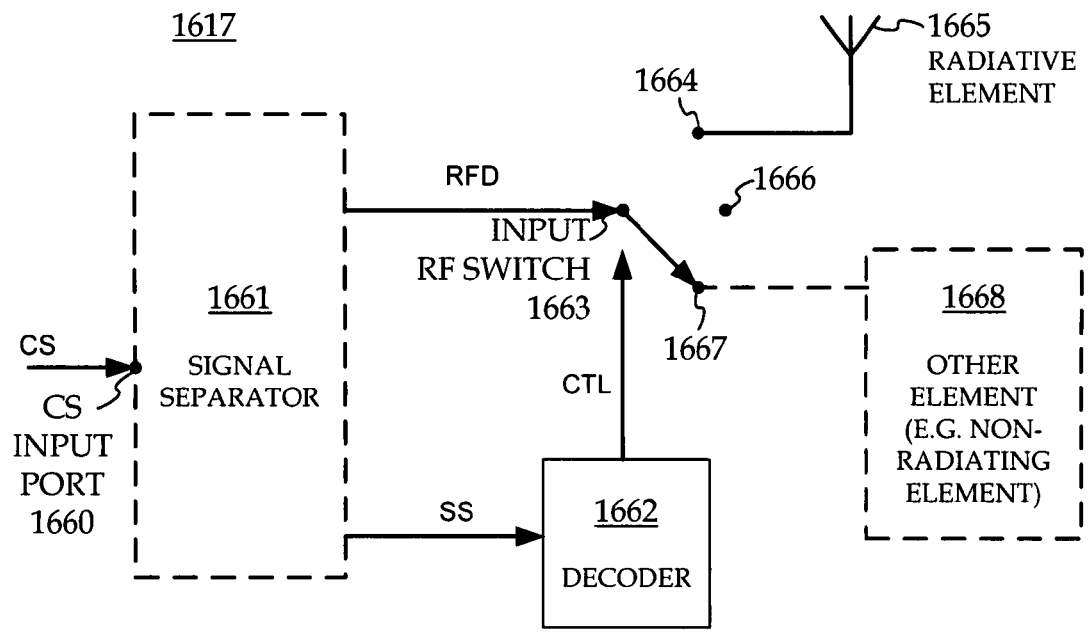
FIG. 16  RFID ANTENNA MODULE
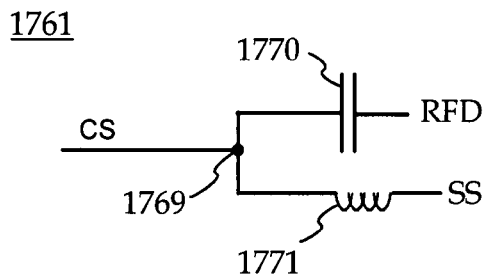
EXAMPLE SIGNAL SEPARATOR
FIG. 17

METHOD PERFORMED BY RFID ANTENNA MODULE

*EXAMPLE DECODER*

*COMPONENTS OF RFID ANTENNA MODULE*

RFID ANTENNA MODULE

EXAMPLE RADIATIVE PATH

EXAMPLE NON-RADIATIVE PATH

*RFID ANTENNA MODULE*

*SECOND EXAMPLE CONFIGURABLE ANTENNA TUNING CIRCUIT*

SECOND EXAMPLE CONFIGURABLE ANTENNA
TUNING CIRCUIT

RFID READER DEVICES AND METHODS THEREOF

CROSS-REFERENCE TO OTHER APPLICATIONS

The present patent application discloses similar subject matter as U.S. patent application Ser. No. 11/807,114 and U.S. patent application Ser. No. 11/807,118, both filed on the same day as the present patent application.

BACKGROUND

1. Field

Embodiments of the invention relate to radio frequency identification (RFID) components and methods. In particular, embodiments of the invention relate to RFID reader system components and methods.

2. Background Information

Radio frequency identification (RFID) systems typically include RFID tags and RFID readers. RFID readers are also known as RFID reader/writers or RFID interrogators. RFID systems may be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data may denote a serial number, a price, a date, a destination, other attribute(s), any combination of attributes, and so on.

An RFID tag typically includes an antenna system, a radio section, a power management section, and frequently a logical section, a memory, or both. In earlier RFID tags, the power management section included an energy storage device, such as a battery. RFID tags with an energy storage device are known as active tags. Advances in semiconductor technology have miniaturized the electronics so much that an RFID tag may be powered solely by the RF signal it receives. Such RFID tags do not include an energy storage device, and are called passive tags.

FIG. 1 is a block diagram of components of a typical RFID system 100. An RFID reader system 101 transmits an interrogating radio frequency (RF) wave 102. RFID tag 104 in the vicinity of RFID reader system 101 may sense interrogating RF wave 102, and generate RF wave 103 in response. RFID reader system 101 senses and interprets wave 103.

Reader system 101 and tag 104 exchange data via wave 102 and wave 103. In a session of such an exchange, each encodes, modulates, and transmits data to the other, and each receives, demodulates, and decodes data from the other. The data is modulated onto, and decoded from, RF waveforms.

Encoding the data in waveforms may be performed in a number of different ways. For example, protocols are devised to communicate in terms of symbols, also called RFID symbols. A symbol for communicating may be a delimiter, a calibration symbol, and so on. Further symbols may be implemented for ultimately exchanging binary data, such as "0" and "1", if that is desired. In turn, when the waveforms are processed internally by reader system 101 and tag 104, they may be equivalently considered and treated as numbers having corresponding values, and so on.

Tag 104 may be a passive tag or an active tag, i.e. having its own power source. Where tag 104 is a passive tag, it is powered from wave 102.

FIG. 2A is a block diagram showing a detail of a prior art RFID reader system 201, which may be the same as RFID reader system 101 shown in FIG. 1. RFID reader system 201 includes an RFID reader device 206, which is also known as a reader box, or just box. The box has at least one port 207-1. As shown, in some embodiments it has four ports 207-1, 207-2, 207-3, and 207-4. Each port may have an antenna driver. For each port there is an output, which is typically a coaxial cable plug. Accordingly cables 208-1, 208-2, 208-3, and 208-4 may be attached to the outputs of the provided respective ports 207-1, 207-2, 207-3, and 207-4, and then the cables 208-1, 208-2, 208-3, and 208-4 may each be attached to one of four respective antennas 209-1, 209-2, 209-3, and 209-4.

Each port may send to its respective antenna a driving signal that is in the RF range. The driving signal causes the antenna to transmit an RF wave, which is analogous to RF wave 102 of FIG. 1. In addition, the RF wave may be backscattered from RFID tags, analogous to RF wave 103 of FIG. 1. The backscattered RF wave then ultimately becomes a signal sensed by the port.

The RFID reader device also has other components, such as hardware and software, which are described in more detail later in this document. The components control the ports, and as such cause RF wave to be sent, and the sensed backscattered RF wave to be interpreted. Optionally and preferably there is a communication link to other equipment, such as a server 205 or the like, for remote operation of system 201.

One drawback to the prior art RFID reader system of FIG. 2A is that the number of antennas is limited by the number of ports on the RFID reader device. In some cases it is desirable to add or otherwise use more antennas than are available on an existing or given RFID reader device. One option is to acquire a different RFID reader device with more ports. Another option is to procure additional RFID reader devices. However, buying an additional RFID reader device or box tends to add additional cost. Additionally, one place in which RFID reader systems are commonly employed is around dock doors in warehouses. Multiple RFID reader devices may tend to complicate assembly or configuration, for example around the dock door.

FIG. 2B is a block diagram showing a detail of another prior art RFID reader system 201, which may be the same as RFID reader system 101 shown in FIG. 1. RFID reader system 201 has a few components similar to those of FIG. 2A. The differences are now described.

A multiplexer 228 is coupled to first port 207-1 of RFID reader box 206. A first antenna 209-1 and a second antenna 209-2 are each coupled with an output of multiplexer 228. An RF signal may be provided from the RFID reader device to the multiplexer.

The multiplexer may switch between providing the RF signal to the first antenna or the second antenna. The multiplexer may receive a signal from the RFID reader system that controls whether the multiplexer switches to the first antenna or the second antenna.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 7 is a block flow diagram of a method of assembling an RFID reader system, according to embodiments of the invention.

FIG. 8 is a block diagram of a RFID reader system having a first optional radiofrequency termination scheme, according to embodiments of the invention.

FIG. 9 is a block diagram of a RFID reader system having a second optional radiofrequency termination scheme, according to embodiments of the invention.

FIG. 10 is a block diagram of a RFID reader device having a receiver/termination suitable for the radiofrequency termination scheme of FIG. 9, according to embodiments of the invention.

FIG. 16 is a block diagram of an example of a RFID antenna module, according to embodiments of the invention. The RFID antenna module includes a RF input port operable to receive at least an RF signal, a decoder operable to generate a control signal in response to a select signal, a radiative element operable to transmit an RF wave in response to the RF signal, and an input RF switch electrically coupled with the RF input port and operable to electrically couple or not couple the RF signal to the radiative element responsive to the control signal.

FIG. 17 is a block diagram of an example signal separator, according to embodiments of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 3:
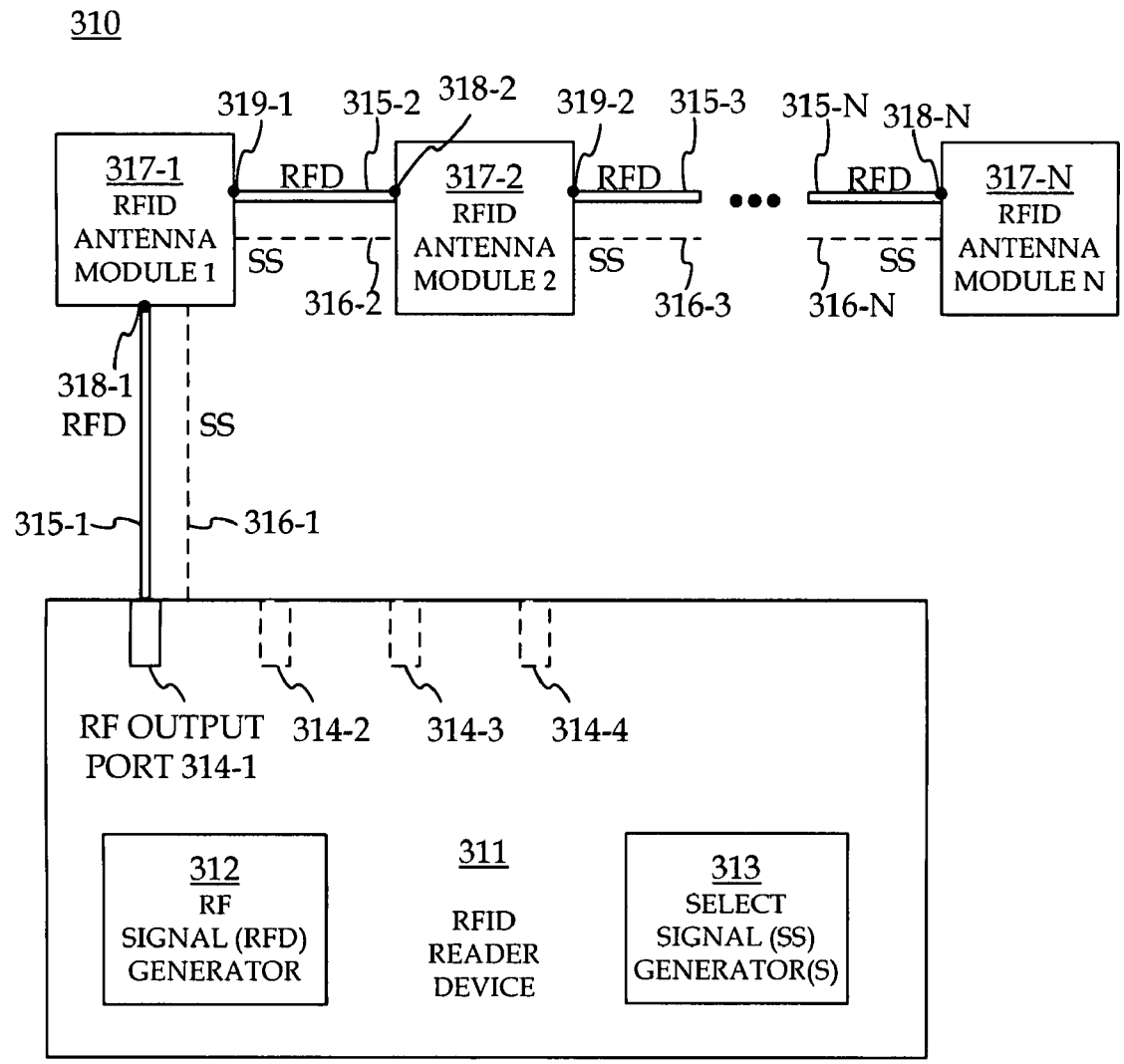
FIG. 3 is a block diagram of a RFID reader system that includes a RFID reader system and RFID antenna modules electrically coupled with the RFID reader system and electrically coupled together, in this particular case in a daisy-chain configuration, according to embodiments of the invention.

FIG. 3 is a block diagram of an RFID reader system 310, according to embodiments of the invention. The RFID reader system includes an RFID reader device 311 and a plurality of RFID antenna modules 317-1, 317-2, 317-N. It will be appreciated from the below that RFID antenna modules 317-1, 317-2, 317-N are well suited for associating with different locations of a place where RFID tags will be deployed. For example, each can be associated with a shelf, an entryway, and so on.

The RFID reader device includes a radio frequency (RF) signal generator 312 and an RF output port 314-1. The RF signal generator is electrically coupled with the RF output port. The RF signal generator is operable to generate an RF signal (RFD) and provide the RF signal (RFD) to the RF output port. The RF signal generator is not limited to a continuous wave (CW) but rather may include the encoding that goes on the waveform. The RF output port is operable to output the RF signal (RFD).

The RF output port is also operable to allow the plurality of RFID antenna modules to be electrically coupled with the RFID reader device. By way of example, the RF output port may include a coaxial cable plug, although this is not required.

In the illustrated system, the plurality of RFID antenna modules are already electrically coupled with the RF output port 314-1, and electrically coupled together. In particular, a first RF input port 318-1 of a first RFID antenna module 317-1 is electrically coupled with the RF output port 314-1 of the RFID reader device through a first coaxial cable or other RF signal (RFD) communication link 315-1. Likewise, a second RF input port 318-2 of a second RFID antenna module 317-2 is electrically coupled with a first RF output port 319-1 of the first RFID antenna module through a second RFD communication link 315-2, etc.

Additional RFID antenna modules may be electrically coupled together in a similar way. Ultimately an Nth RF input port 318-N of an Nth RFID antenna module 317-N is electrically coupled with the preceding RFID antenna modules through an Nth RFD communication link 318-N, where N is an integer. In this configuration the RFID antenna modules are electrically coupled together in a daisy-chain configuration, although this is not required.

In operation, versions of the original RF signal (RFD) output through the RF output port may be communicated between the RFID antenna modules along the aforementioned RFD communication links. Losses generally occur and cumulatively reduce the strength of the RF signal (RFD). For this reason, N is often not more than about seven to ten for practical applications, although the scope of the invention is not so limited, and more could be achieved.

Figure 2A:
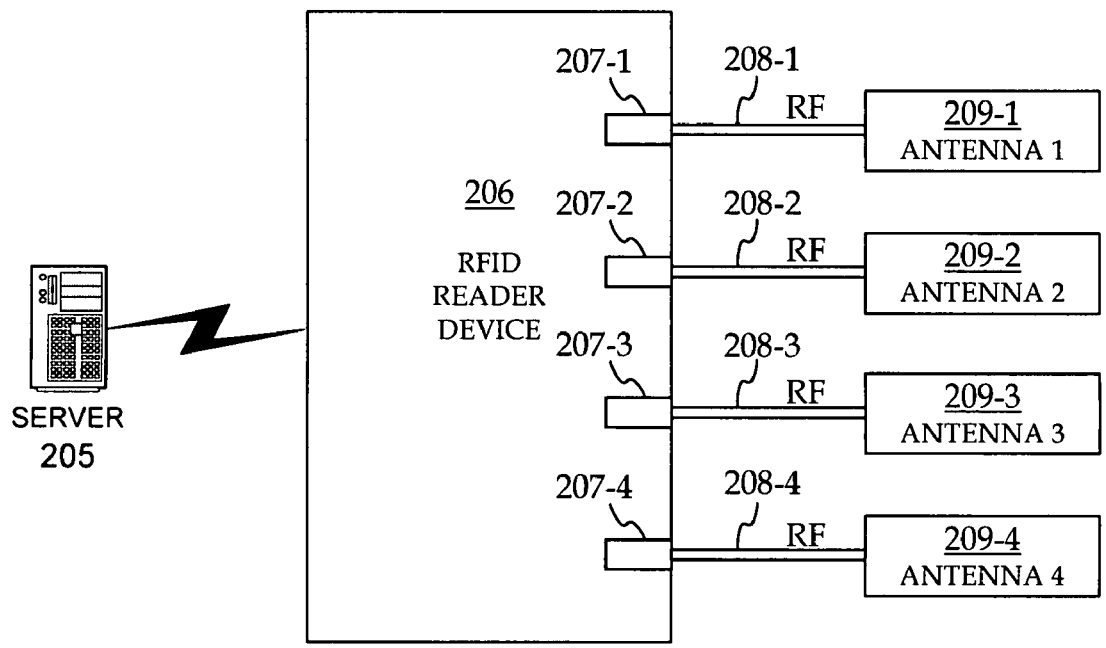
FIG. 2A is a block diagram showing a detail of a prior art RFID reader system.
Figure 2B:
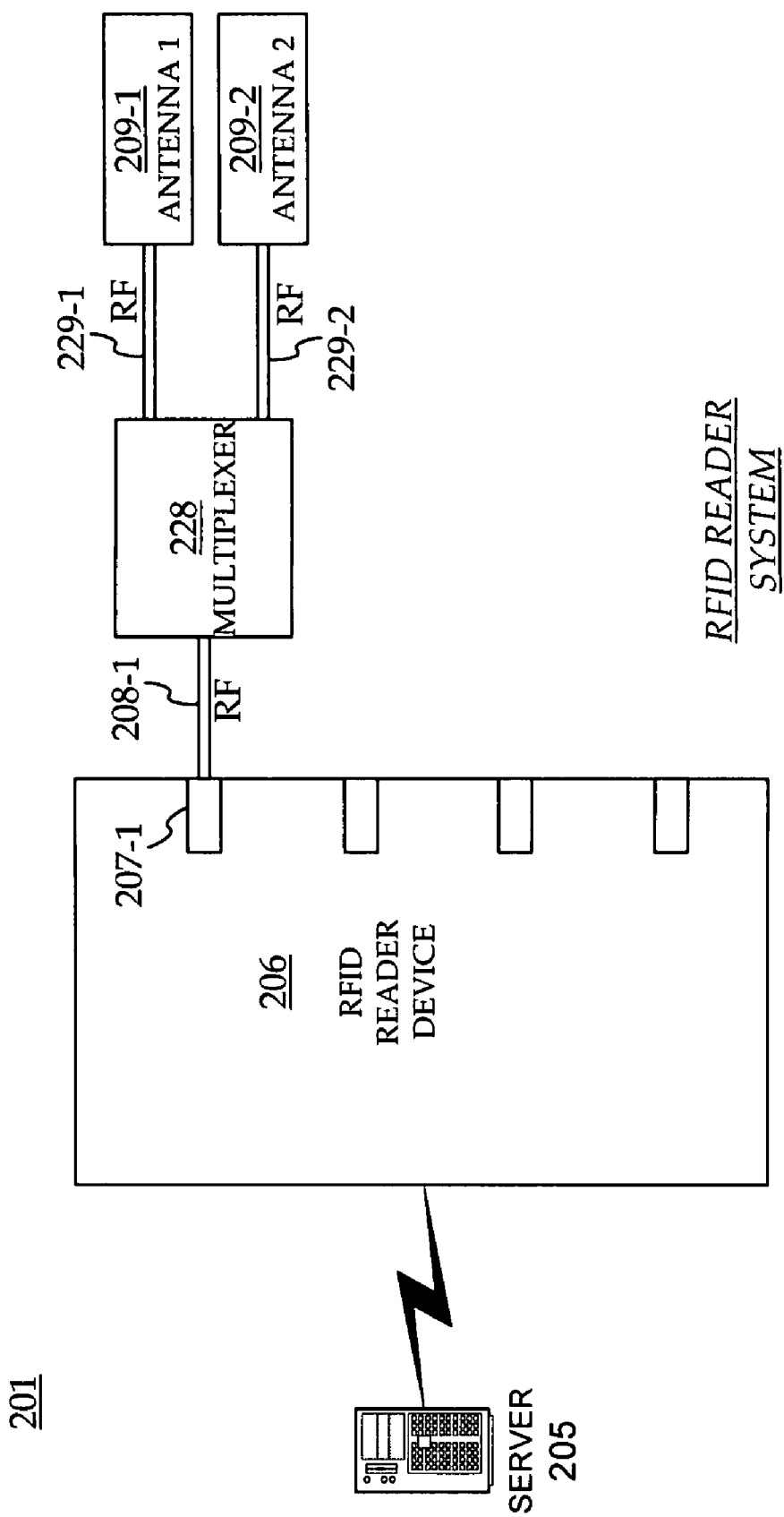
FIG. 2B is a block diagram showing a detail of another prior art RFID reader system.

Note that this coupling is in contrast to the prior art approach shown in FIG. 2A. There, each one of antennas 209-1, 209-2, 209-3, 209-4 was coupled with a different one of the respective ports 207-1, 207-2, 207-3, 207-4 of the RFID reader device. Accordingly, there was a one-to-one correspondence between ports and antennas. Same with FIG. 2B, where the number of ports is effectively extended by using multiplexer 228. However, in the RFID reader system of FIG. 3, multiple antenna modules are electrically coupled with the same RF output port.

Referring again to FIG. 3, the RFID reader device includes a select signal generator 313. The select signal (SS) generator may be operable to generate a select signal (SS). The select signal may be operable to be output from the RFID reader device. The select signal may be operable to select one or more of the plurality of RFID antenna modules electrically coupled behind a given shared RF output port. Generally the select signal may be operable to select a subset of less than all the RFID antenna modules coupled behind a given shared RF output port. In one aspect, each of the selected RFID antenna modules may transmit an RF wave.

Different ways of implementing the select signal generator are possible. As one illustrative embodiment, the select signal generator may include a digital-to-analog converter (DAC). The DAC may convert a binary number corresponding to a given RFID antenna module into a corresponding voltage level, other variable level direct current signal, or other analog signal. The analog signal may correspond to the given RFID antenna module. For example, as will be explained further below, the RFID antenna module may include a decoder capable of recognizing the analog signal as a signal selecting its RFID antenna module. Alternatively, the select signal may be provided through a modulated carrier, for example AM/ASK (amplitude modulation/amplitude-shift keying), FM/FSK (frequency modulation/frequency-shift keying), PM/PSK (phase modulation/phase-shift keying), or a combination thereof.

Additionally, different ways of communicating the select signal (SS) are possible. As shown in the illustration, dedicated select signal communication links 316-1, 316-2, 316-3, 316-N may optionally be used to convey the select signal from the RFID reader device to and between the antenna modules. However, as indicated by the dashed lines, these dedicated links are optional. Generally, they add to the amount of cabling and assembly effort to set up the system. As will be explained further below, the select signals may alternatively optionally be conveyed along the previously described RF signal (RFD) communication links 315-1, 315-2, 315-3, 315-N.

Now, one potential advantage of the RFID reader system of FIG. 3 is the ability to have more antennas (e.g., RFID antenna modules) than RF output ports, since multiple RFID antenna modules may be electrically coupled with each RF output port. Notice that this is in contrast to the RFID reader system of FIG. 2, where the number of antennas was limited by the number of ports on the RFID reader device.

Furthermore, as shown in the illustration, the RFID reader device may include one or more optional additional RF output ports 314-2, 314-3, 314-4. Each of these RF output ports may allow multiple RFID antenna modules to be coupled and selected as discussed above. Advantageously, this may further increase the number of antennas (e.g., antenna modules) at the disposal of the RFID reader system.

The invention also includes methods. Some are methods of operation of an RFID reader or RFID reader system. Others are methods for controlling an RFID reader or RFID reader system.

These methods may be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each may be only with a machine that performs a portion of the program.

Figure 4:
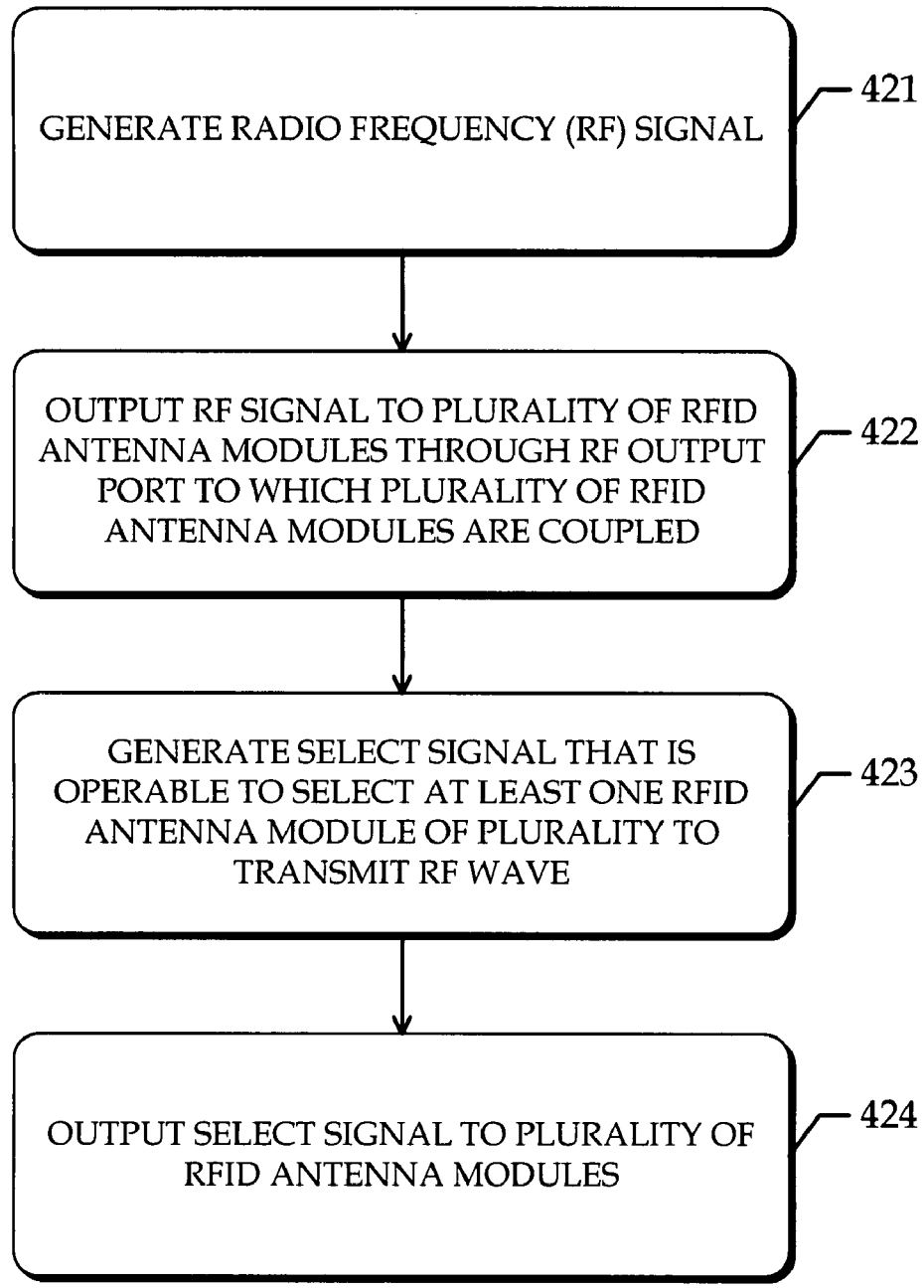
FIG. 4 is a block flow diagram of a method performed by an RFID reader device, according to embodiments of the invention.

FIG. 4 is a block flow diagram of a method 420 performed by an RFID reader device, according to embodiments of the invention.

At block 421, the RFID reader device may generate a radio frequency (RF) signal. In one or more embodiments of the invention, the RF signal may be generated by the RF signal generator of FIG. 4. Conventional approaches for generating RF signals (RFD), such as, for example, as generated by the antenna drivers of FIG. 2, may optionally be used.

Then, the RF signal may be output to a plurality of RFID antenna modules through an RF output port to which the plurality of RFID antenna modules are electrically coupled, at block 422. This may be performed as previously described.

At block 423, a select signal that is operable to select at least one RFID antenna module of the plurality to transmit an RF wave may be generated. In one or more embodiments of the invention, a select signal that is operable to select multiple RFID antenna modules to transmit an RF wave may be generated. In one or more embodiments of the invention, a select signal that is operable to select among a greater number of RFID antenna modules than there are RF output ports on an RFID reader device may be generated.

Then, the select signal may be output to the plurality of RFID antenna modules, at block 424. In one or more embodiments of the invention, the select signal may be output through the RF output port used to output the RF signal. In one aspect, the select signal may be output through the RF output port at a different time than the RF signal is output. Alternatively, rather than outputting the select signal through the RF output port, the select signal may be output through a dedicated select signal output port.

A particular method has been described, although the scope of the invention is not limited to this particular method. Various modifications of the method are also possible and contemplated. In one aspect, certain operations of the methods may optionally be performed in different order and/or at least partially concurrently. For example, the select signal may be generated before the RF signal is generated, or these signals may be generated at least partially concurrently. As another example, the select signal may be output before the RF signal is output, or these signals may be output at least partially concurrently. In another aspect, operations may optionally be added to and/or removed from the method. For example, an operation described further below of combining the RF signal with the select signal may optionally be added to the method. Other modifications of the method are possible and will be apparent to those skilled in the art and having the benefit of the present disclosure.

Figure 5:
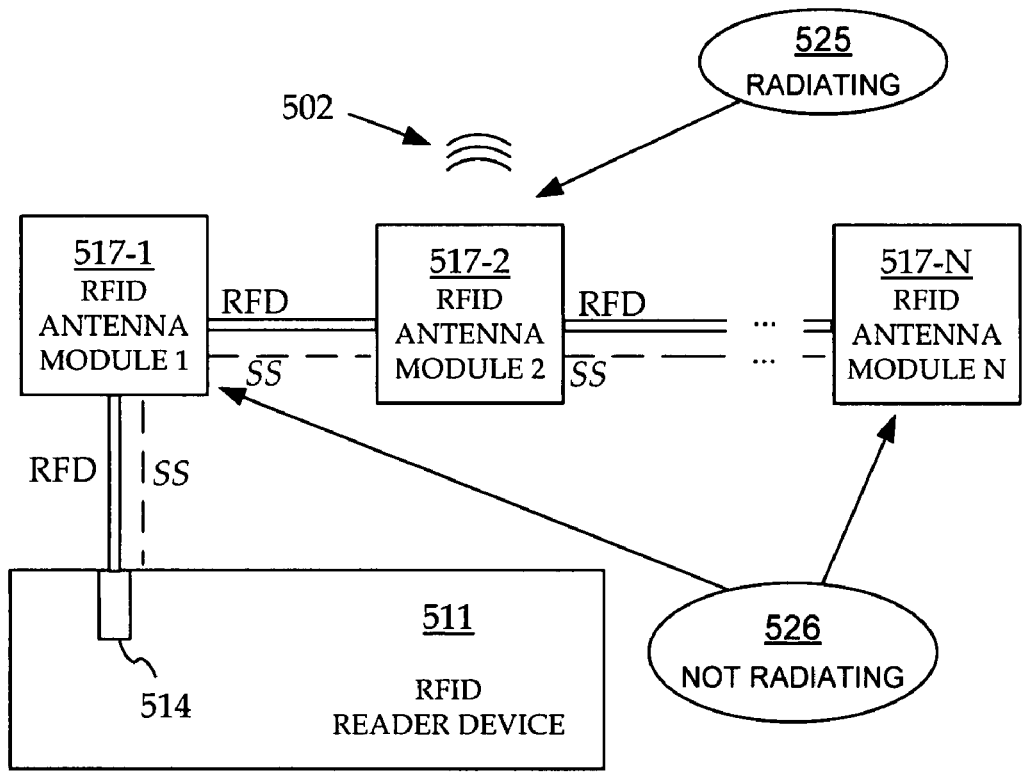
FIG. 5 is a block diagram of a RFID reader system shown assembled and in operation with only one RFID antenna module transmitting a radiofrequency wave, according to an illustrative embodiment of the invention.

FIG. 5 is a block diagram of a RFID reader system 510 shown assembled and in operation with only one RFID antenna module, in this particular case RFID antenna module 2 517-2, transmitting a radiofrequency (RF) wave 502, according to an illustrative embodiment of the invention.

The RFID reader system includes an RFID reader device 511 having a radio frequency (RF) output port 514 operable to output an RF signal (RFD). The system also includes a plurality of RFID antenna modules 517-1, 517-2, 517-N electrically coupled with the RF output port and electrically coupled together to each receive the RF signal (RFD). Receiving the RF signal (RFD) as used herein is intended to encompass receiving a version of the RF signal (RFD) reflecting losses and/or amplification but nevertheless derived in some way from the RF signal.

The RFID reader device is also operable to generate and output a select signal (SS). The RFID antenna modules may each receive the select signal (SS). In the illustrative embodiment, the select signal (SS) is operable to select only RFID antenna module 2 517-2. As a result, as shown at comment 525, responsive to receiving the RF signal and the select signal (SS), the selected RFID antenna module 2 may be radiating, or transmitting an RF wave 502. In contrast, as shown at comment 526, the other non-selected antenna modules, namely RFID antenna module 1 and RFID antenna module N, may not be radiating or transmitting RF waves.

Otherwise, the attributes of the RFID reader system 510 and its components may be similar to or the same as those of FIG. 3. To avoid obscuring certain concepts, the discussion has focused primarily on the different and/or additional attributes, as opposed to repeating the similarities.

Figure 6:
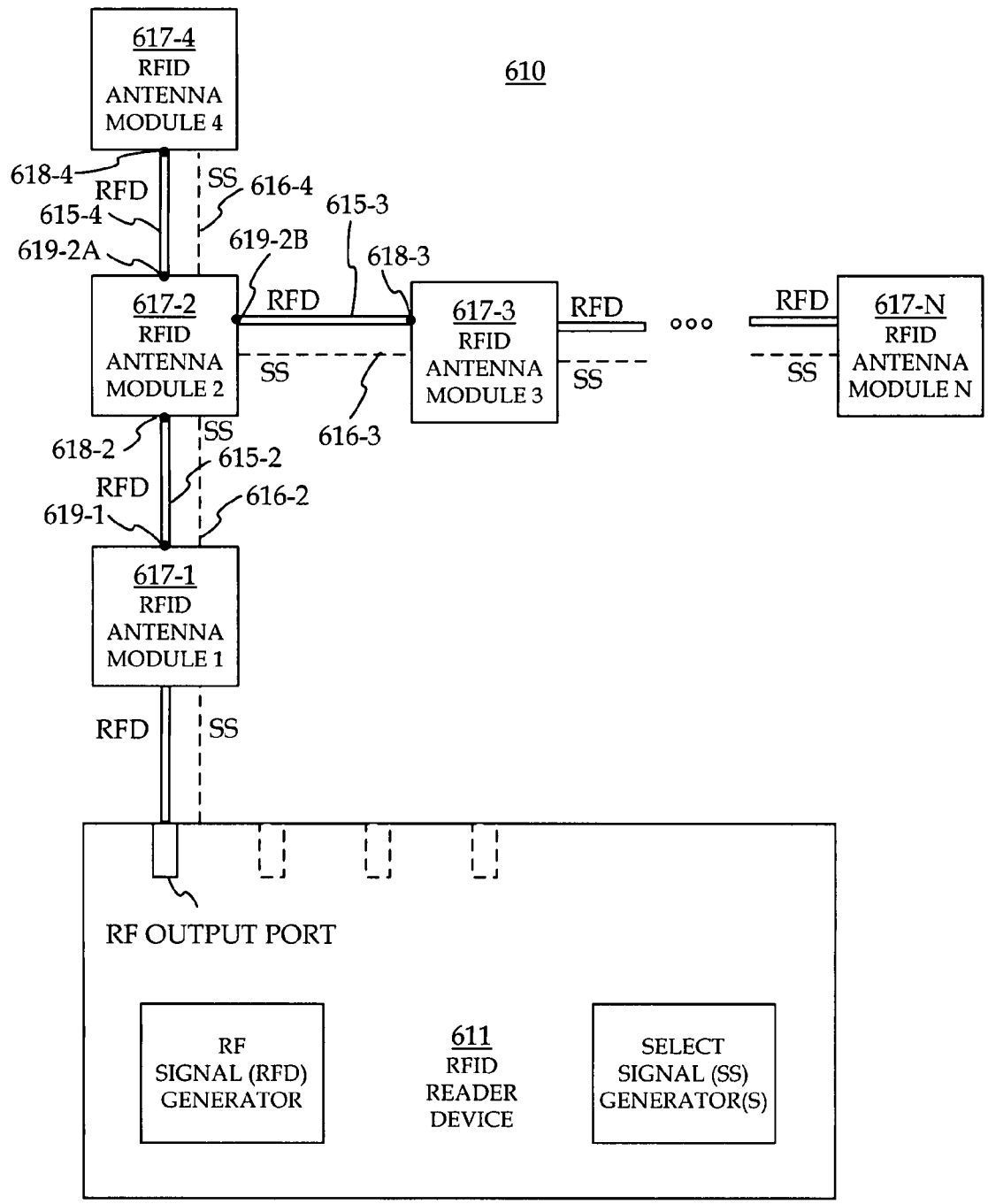
FIG. 6 is a block diagram of a RFID reader system similar to that shown in FIG. 3 except that the RFID antenna modules are electrically coupled together in a branched configuration, according to embodiments of the invention.

FIG. 6 is a block diagram of a RFID reader system similar to that shown in FIG. 3 except that the RFID antenna modules are electrically coupled together in a branched configuration, as opposed to a daisy-chain configuration, according to embodiments of the invention. The branched configuration tends to be slightly more complex than the daisy-chain configuration.

In this branched configuration, RFID antenna module 2 617-2 is electrically connected through links to three other RFID antenna modules, instead of just two. In particular, RFID antenna module 2 has an RF input port 618-2 that is electrically coupled with an RF output port of RFID antenna module 1 through an RF signal (RFD) communication link 615-2. RFID antenna module 2 has a first RF output port 619-2A that is electrically coupled with an RF input port 618-3 of RFID antenna module 3 through an RFD communication link 615-3. RFID antenna module 2 has a second RF output port 619-2A that is electrically coupled with an RF input port 618-4 of RFID antenna module 4 through an RFD communication link 615-4.

In one or more embodiments of the invention, the RFID antenna module 2 may communicate RF signals (RFD) and select signals (SS) to any one or group of the RFID antenna modules to which it is connected.

Otherwise the attributes of the RFID reader system 610 and its components may be similar to or the same as those of FIG. 3. To avoid obscuring certain concepts, the discussion has focused primarily on the different and/or additional attributes, as opposed to repeating the similarities.

FIG. 7 is a block flow diagram of a method 730 of assembling an RFID reader system, according to embodiments of the invention.

At block 731, an RF input port of a first RFID antenna module may be electrically coupled with an RF output port of an RFID reader device. For example, as shown in FIG. 3, RF input port 318-1 of RFID antenna module 1 may be electrically coupled with an RF output port 314-1 of RFID reader device 311, such as, for example, by plugging a coaxial cable or other communication link into these ports. The first RFID antenna module may have an RF output port, such as, for example, RF output port 319-1.

Referring again to FIG. 7, at block 732, an RF input port of a second RFID antenna module may be electrically coupled with the RF output port of the first RFID antenna module. For example, as shown in FIG. 3, RF input port 318-2 of RFID antenna module 2 may be electrically coupled with RF output port 319-1 of RFID antenna module 1, such as, for example, by plugging a coaxial cable or other communication link into these ports.

A particular method has been described, although the scope of the invention is not limited to this particular method. Various modifications of the method are also possible and contemplated. In one aspect, certain operations of the methods may optionally be performed in different order and/or at least partially concurrently. For example, the operations of block 732 may be performed before or partially concurrently with the operations of block 731. In another aspect, operations may optionally be added to and/or removed from the method. For example, coupling the ports may also include coupling select signal (SS) communication links, or else separate, dedicated SS communication links may be coupled. As another example, one or more other RFID antenna modules may optionally be electrically coupled in an analogous way, for example in either a daisy-chain or branched configuration. Other modifications of the method are possible and will be apparent to those skilled in the art and having the benefit of the present disclosure.

RF signals (RFD) reaching a last connected RFID antenna module may tend to reflect. Such reflections may make it back to the RFID reader device, and may tend to add noise. In one or more embodiments of the invention, it may be desirable to terminate the RF signals (RFD) to reduce reflection.

FIG. 8 is a block diagram of a RFID reader system having a first optional radiofrequency (RF) termination scheme, according to embodiments of the invention.

An RFID reader device 811 may output an RF signal (RFD) on a first RFD communication link 815-1. An Nth RFID antenna module 817-N may receive at least a version of the RF signal (RFD) on an Nth RFD communication link 815-N. By way of example, the Nth RFID antenna module may be the last RFID antenna module of a plurality of RFID antenna modules connected in a daisy-chain configuration or the last RFID antenna module of a branch.

The Nth RFID antenna module has an RF output port 819-N to output a version of the RF signal (RFD). An RF termination 834 is electrically coupled with the RF output port through an RFD communication link 833. The RF termination may receive a version of the RF signal (RFD) from the Nth RFID antenna module, and may terminate the received version of the RF signal (RFD). Examples of suitable RF terminations include, but are not limited to, resistors to take in the RF signal without significant reflection, antennas, other RF termination device in the arts, and combinations of such RF terminations. Alternatively, the termination may be directly integrated into the Nth RFID antenna module.

Other termination schemes are also contemplated. FIG. 9 is a block diagram of an RFID reader system having a second optional radiofrequency termination scheme, according to embodiments of the invention.

As in the previous scheme, an RFID reader device 911 may output an RF signal (RFD) on a first RFD communication link 915-1. An Nth RFID antenna module 917-N may receive at least a version of the RF signal (RFD) on an Nth RFD communication link 915-N. The Nth RFID antenna module has an RF output port 919-N to output a version of the RF signal (RFD).

However, in the current scheme, the RFID reader device has an RF return port 935 that is operable to be electrically coupled with an RFID antenna module. As shown, the RF output port 919-N of the Nth RFID antenna module is electrically coupled with the RF return port 935 of the RFID reader device through an RF signal (RFD) return communication link 933. The RF may receive an RF return signal (RFS), which is derived from the original RF signal (RFD) output from the RF output port, through the RF output port 919-N of the Nth RFID antenna module.

FIG. 10 is a block diagram of a RFID reader device 1011 having an RF receiver/termination suitable for the radiofrequency termination scheme of FIG. 9, according to embodiments of the invention.

The RFID reader device has an RF signal generator 1012 and an RF output port 1014. An RF signal (RFD) may be output from the RF output port, as previously described.

The RFID reader device also has an RF return port 1035 and an RF receiver/termination 1036. The RF return port is operable to be electrically coupled with a RFID antenna module, as previously described, to receive an RF return signal (RFS) derived from the RF signal (RFD) provided to the output port. The RF receiver/termination is electrically coupled with the RF return port. The RF receiver/termination may receive and terminate the RF return signal (RFS). The previously described types of RF terminations are suitable.

Figure 1:
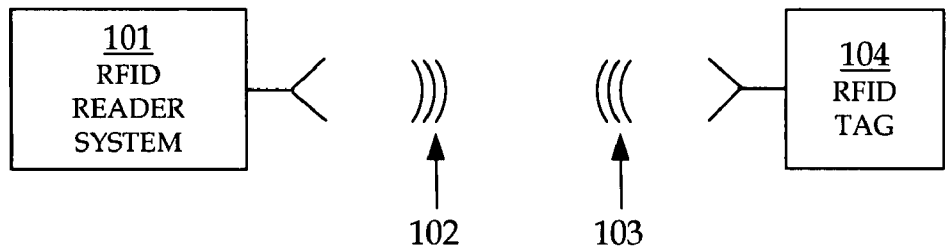
FIG. 1 is a block diagram of components of a radiofrequency identification (RFID) system.
Figure 11:
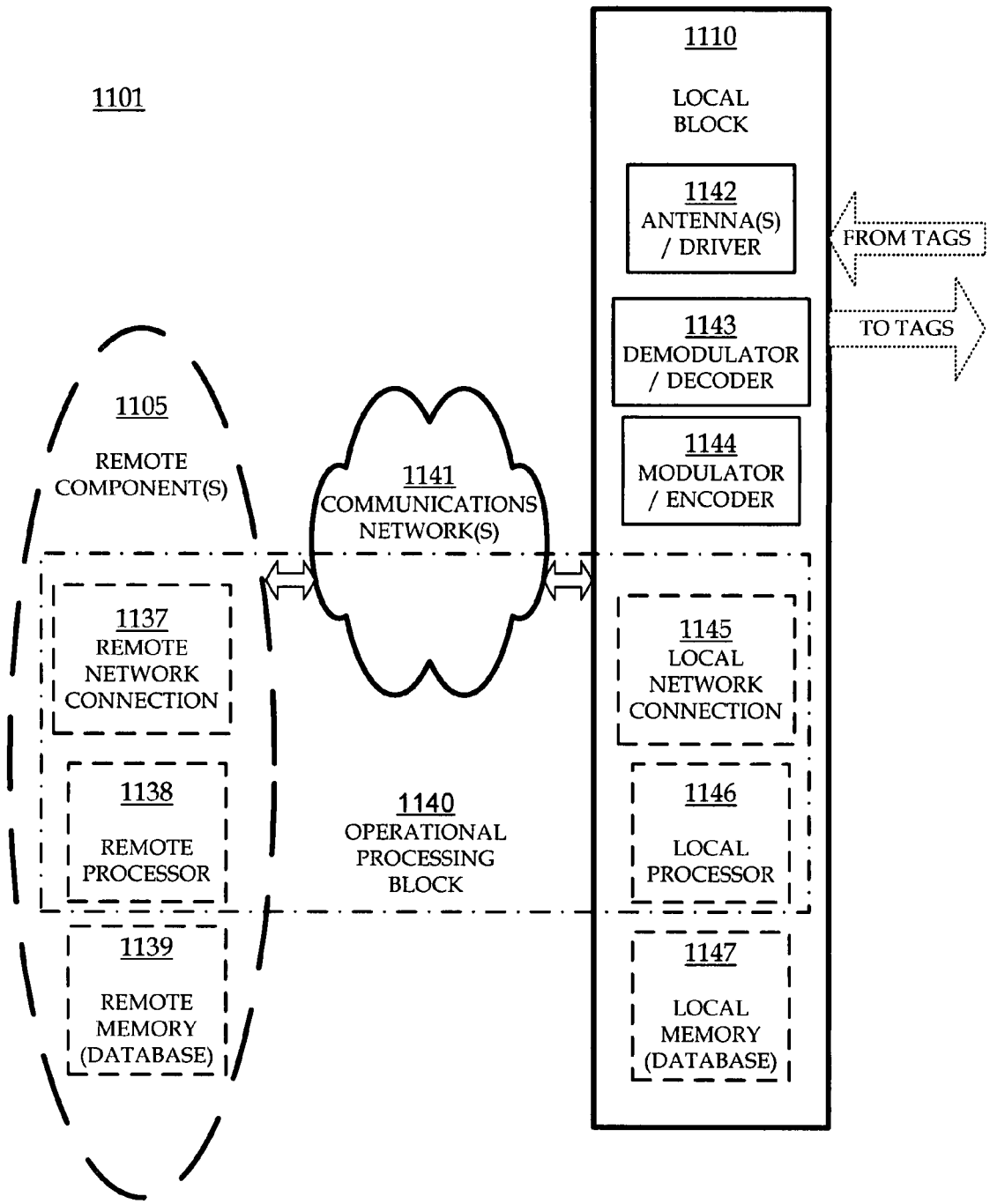
FIG. 11 is a block diagram of a whole RFID reader system configuration with optional local and remote components, according to embodiments of the invention.

FIG. 11 is a block diagram of an RFID reader system 1101, according to embodiments of the invention. System 1101 includes a local block 1110, and optionally remote components 1105. Local block 1110 and remote components 1105 may be implemented in any number of ways. It will be recognized that reader 101 of FIG. 1 is the same as local block 1110, if remote components 1105 are not provided. Alternately, reader 101 may be implemented instead by system 1101, of which only the local block 1110 is shown in FIG. 1. Plus, local block 1110 may be unit 206 of FIG. 2A.

Local block 1110 is responsible for communicating with the tags. Local block 1110 includes a block 1142 of an antenna and a port of the antenna for communicating with the tags. Some readers, like that shown in local block 1110, contain a single antenna and port. Some readers contain multiple antennas and ports and a method to switch signals among them, including sometimes using different antennas for transmitting and for receiving. And some readers contain multiple antennas and ports that may operate simultaneously. A demodulator/decoder block 1143 demodulates and decodes backscattered waves received from the tags via antenna block 1142. Modulator/encoder block 1144 encodes and modulates an RF wave that is to be transmitted to the tags via antenna block 1142.

Local block 1110 additionally includes an optional local processor 1146. Processor 1146 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases some or all of the decoding function in block 1143, the encoding function in block 1144, or both, may be performed instead by processor 1146.

Local block 1110 additionally includes an optional local memory 1147. Memory 1147 may be implemented in any number of ways known in the art. Such ways include, by way of example and not of limitation, nonvolatile memories (NVM), read-only memories (ROM), random access memories (RAM), any combination of one or more of these, and so on. Memory 1147, if provided, may include programs for processor 1146 to run, if provided.

In some embodiments, memory 1147 stores data read from tags, or data to be written to tags, such as Electronic Product Codes (EPCs), Tag Identifiers (TIDs) and other data. Memory 1147 may also include reference data that is to be compared to the EPC codes, instructions and/or rules for how to encode commands for the tags, modes for controlling antenna 1142, and so on. In some of these embodiments, local memory 1147 is provided as a database.

Some components of local block 1110 typically treat the data as analog, such as the antenna/port block 1142. Other components such as memory 1147 typically treat the data as digital. At some point there is a conversion between analog and digital. Based on where this conversion occurs, a whole reader may be characterized as "analog" or "digital", but most readers contain a mix of analog and digital functionality.

If remote components 1105 are indeed provided, they are coupled to local block 1110 via an electronic communications network 1141. Network 1141 may be a Local Area Network (LAN), a Metropolitan Area Network (MAN), a Wide Area Network (WAN), a network of networks such as the interne, and so on. In turn, local block 1110 then includes a local network connection 1145 for communicating with network 1141.

There may be one or more remote component(s) 1105. If more than one, they may be located at the same place with each other, or in different places. They may access each other and local block 1110 via network 1141, or via other similar networks, and so on. Accordingly, remote component(s) 1105 may use respective remote network connections. Only one such remote network connection 1137 is shown, which is similar to local network connection 1145, etc.

Remote component(s) 1105 may also include a remote processor 1138. Processor 1138 may be made in any way known in the art, such as was described with reference to local processor 1146.

Remote component(s) 1105 may also include a remote memory 1139. Memory 1139 may be made in any way known in the art, such as was described with reference to local memory 1147. Memory 1139 may include a local database, and a different database of a Standards Organization, such as one that may reference EPCs.

Of the above-described elements, it is advantageous to consider a combination of these components, designated as operational processing block 1140. Block 1140 includes those that are provided of the following: local processor 1146, remote processor 1138, local network connection 1145, remote network connection 1137, and by extension an applicable portion of network 1141 that links connection 1145 with connection 1137. The portion may be dynamically changeable, etc. In addition, block 1140 may receive and decode RF waves received via antenna 1142, and cause antenna 1142 to transmit RF waves according to what it has processed.

Block 1140 includes either local processor 1146, or remote processor 1138, or both. If both are provided, remote processor 1138 may be made such that it operates in a way complementary with that of local processor 1146. In fact, the two may cooperate. It will be appreciated that block 1140, as defined this way, is in communication with both local memory 1147 and remote memory 1139, if both are present.

Accordingly, block 1140 is location agnostic, in that its functions may be implemented either by local processor 1146, or by remote processor 1138, or by a combination of both. Some of these functions are preferably implemented by local processor 1146, and some by remote processor 1138. Block 1140 accesses local memory 1147, or remote memory 1139, or both for storing and/or retrieving data.

Reader system 1101 operates by block 1140 generating communications for RFID tags. These communications are ultimately transmitted by antenna block 1142, with modulator/encoder block 1144 encoding and modulating the information on an RF wave. Then data is received from the tags via antenna block 1142, demodulated and decoded by demodulator/decoder block 1143, and processed by processing block 1140.

Figure 12:
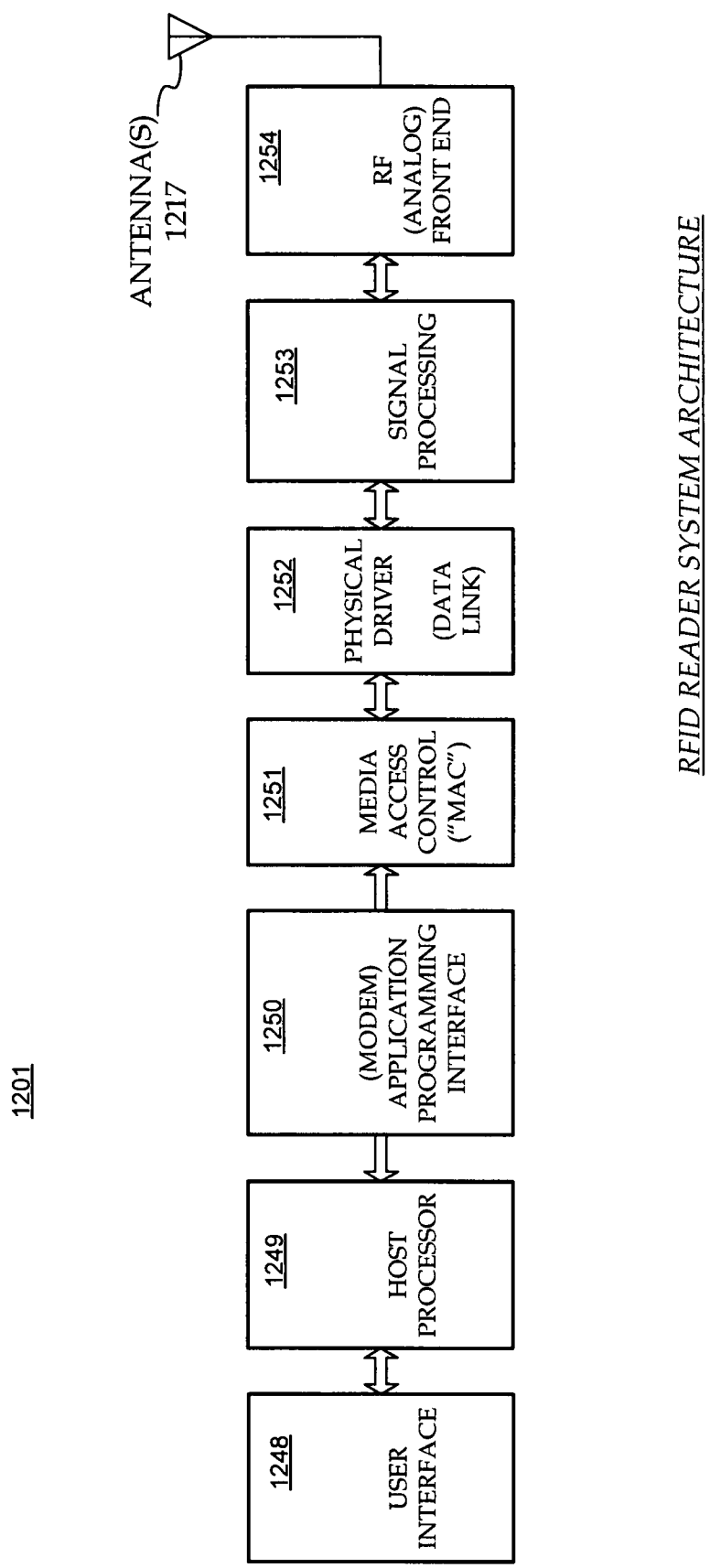
FIG. 12 is a block diagram of an overall architecture of a RFID reader system, according to embodiments of the invention.

FIG. 12 is a block diagram of an overall architecture of an RFID reader system 1201, according to embodiments of the invention. It will be appreciated that system 1201 is considered subdivided into modules or components. Each of these modules may be implemented by itself, or in combination with others. It will be recognized that some aspects are parallel with those of FIG. 11. In addition, some of them may be present more than once.

RFID reader system 1201 includes one or more antennas 1217, and an RF Front End 1254, for interfacing with antenna(s) 1217. These may be made as described above. In addition, Front End 1254 typically includes analog components.

System 1201 also includes a Signal Processing module 1253. In this embodiment, module 1253 exchanges waveforms with Front End 1254, such as I and Q waveform pairs. In some embodiments, signal processing module 1253 is implemented by itself in an FPGA.

System 1201 also includes a Physical Driver module 1252, which is also known as Data Link. In this embodiment, module 1252 exchanges bits with module 1253. Data Link 1252 may be the stage associated with framing of data. In one embodiment, module 1252 is implemented by a Digital Signal Processor.

System 1201 additionally includes a Media Access Control module 1251, which is also known as MAC layer. In this embodiment, module 1251 exchanges packets of bits with module 1252. MAC layer 1251 may be the stage for making decisions for sharing the medium of wireless communication, which in this case is the air interface. Sharing may be between reader system 1201 and tags, or between system 1201 with another reader, or between tags, or a combination. In one embodiment, module 1251 is implemented by a Digital Signal Processor.

System 1201 moreover includes an Application Programming Interface module 1250, which is also known as API, Modem API, and MAPI. In some embodiments, module 1250 is itself an interface for a user.

System 1201 further includes a host processor 1249. Processor 1249 exchanges signals with MAC layer 1251 via module 1250. In some embodiments, host processor 1249 is not considered as a separate module, but one that includes some of the above-mentioned modules of system 1201. A user interface 1248 is coupled to processor 1249, and it may be manual, automatic, or both.

Host processor 1249 may include applications for system 1201. In some embodiments, elements of module 1250 may be distributed between processor 1249 and MAC layer 1251.

It will be observed that the modules of system 1201 form something of a chain. Adjacent modules in the chain may be coupled by the appropriate instrumentalities for exchanging signals. These instrumentalities include conductors, buses, interfaces, and so on. These instrumentalities may be local, e.g. to connect modules that are physically close to each other, or over a network, for remote communication.

The chain is used in opposite directions for receiving and transmitting. In a receiving mode, wireless waves are received by antenna(s) 1217 as signals, which are in turn processed successively by the various modules in the chain. Processing may terminate in any one of the modules. In a transmitting mode, initiation may be in any one of these modules. That, which is to be transmitted becomes ultimately signals for antenna(s) 1217 to transmit as wireless waves.

The architecture of system 1201 is presented for purposes of explanation, and not of limitation. Its particular subdivision into modules need not be followed for creating embodiments according to the invention. Furthermore, the features of the invention may be performed either within a single one of the modules, or by a combination of them.

An economy is achieved in the present document in that a single set of flowcharts is used to describe methods in and of themselves, along with operations of hardware and/or software. This is regardless of how each element is implemented.

Figure 13:
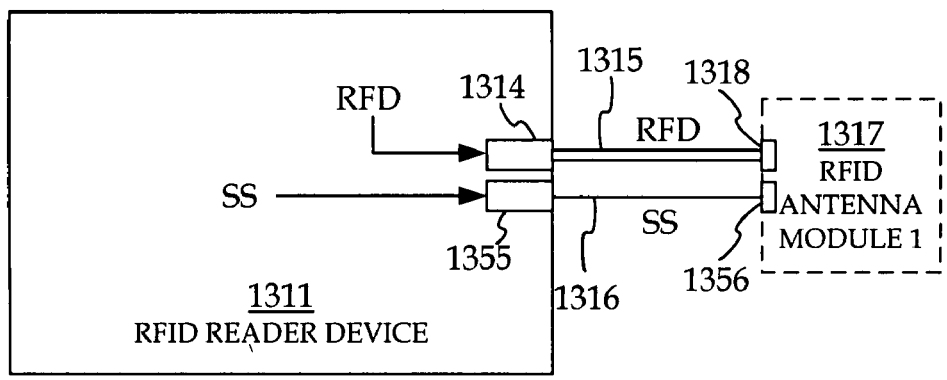
FIG. 13 is a block diagram of an RFID reader device having separate radiofrequency and select signal ports to provide separate radiofrequency and select signals, according to embodiments of the invention.

FIG. 13 is a block diagram of an RFID reader device 1311 having separate ports 1314, 1355 to output separate RF signals and select signals, according to embodiments of the invention.

The RFID reader device includes an RF output port 1314. An RF signal (RFD) may be output through the RF output port. Also shown is an optional RFID antenna module 1 1317. The RFID antenna module is shown in dashed lines to indicate that RFID reader devices and RFID antenna modules may be manufactured and sold separately. An RF input port 1318 of the RFID antenna module may be electrically coupled with the RF output port over an RF signal communication link 1315 to receive the RF signal (RFD).

In addition, the RFID reader device includes a select signal (SS) output port 1355. A select signal (SS) may be output through the SS output port. An SS input port 1356 of the RFID antenna module may be electrically coupled with the SS output port over an SS signal communication link 1316 to receive the select signal (SS). The RFID antenna module may also include an SS output port (not shown) to provide a version of the select signal to one or more other coupled RFID antenna modules (not shown)

In one or more embodiments of the invention, the SS signal communication link may include a single wire capable of carrying a voltage or other analog select signal. Alternatively, a coaxial cable, or other more sophisticated communication link, may optionally be used.

Using separate ports and communication links for the RF signals (RFD) and select signals (SS) may increase the amount of cabling and correspondingly increase the amount of time and effort to connect or assemble the RFID reader system. While this may be fine in certain embodiments, in other embodiments it may be undesirable.

Figure 14:
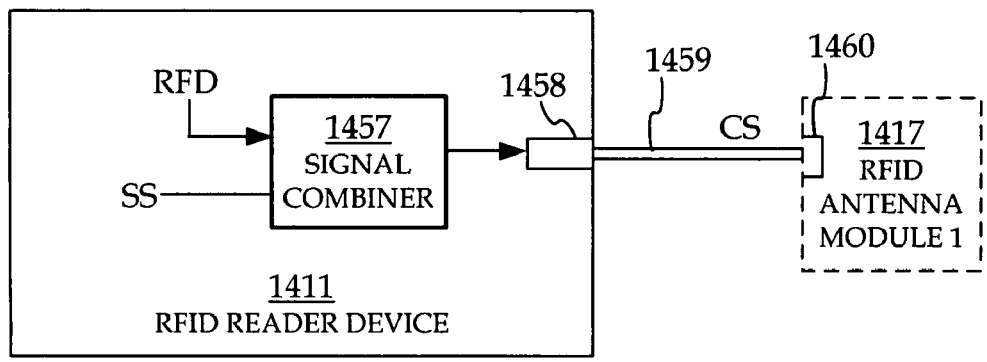
FIG. 14 is a block diagram of a RFID reader device having a signal combiner to combine a radiofrequency signal and a select signal into a combined signal and output the combined signal through a combined signal port, according to embodiments of the invention.

FIG. 14 is a block diagram of an RFID reader device 1411 having a signal combiner 1457 to combine a RF signal (RFD) and a select signal (SS) into a combined signal (CS) and output the combined signal (CS) through a combined signal port 1458, according to embodiments of the invention.

The signal combiner is electrically coupled with an RF signal generator (not shown) and with a select signal generator (not shown) to receive the RF signal (RFD) and the select signal (SS). The signal combiner is also electrically coupled with a combined signal (CS) output port 1458. The signal combiner is operable to combine the RF signal (RFD) and the select signal (SS) into a combined signal (CS) and provide the combined signal (CS) to the combined signal output port.

A CS input port 1460 of an optional RFID antenna module 1 1417 may be electrically coupled with the CS output port over a CS signal communication link 1459 to receive the combined signal (CS). The RFID antenna module may also include a CS output port (not shown) to provide a version of the combined signal to one or more other coupled RFID antenna modules (not shown). For clarity, as used herein a CS port or communication link is both an RF signal port or communication link and a SS port or communication link.

Advantageously, since a combined port and communication link is used for both the RF and select signals, the amount of cabling and connection time may be reduced compared to the approach of FIG. 13. As yet another option, the RF signal (RFD) and the select signal (SS) may potentially be output through the same port and over the same communication link, but at different times, without being combined. Generally the select signal would be output before the RF signal.

Figure 15:
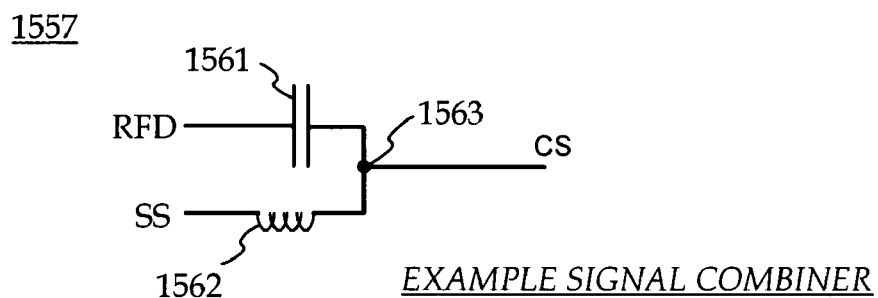
FIG. 15 is a block diagram of an example signal combiner, according to embodiments of the invention.

FIG. 15 is a block diagram of an example signal combiner, according to embodiments of the invention. The signal combiner includes a capacitor 1561 and an inductor 1562. An RF signal (RFD) may be provided to the capacitor. At about the same time, a select signal (SS) may be provided to the inductor. The RFD and SS may be combined at a node 1563 as a combined signal (CS).

FIG. 16 is a block diagram of an example of an RFID antenna module 1617, according to embodiments of the invention. The module may include an assembly of components configured to be used with one or more other modules.

The RFID antenna module has an optional CS input port 1660. A combined signal (CS1) is received at the CS input port. The combined signal includes both an RF signal (RFD) and a select signal (SS). As a result, the CS input port 1660 is also considered an RF input port. Accordingly, the RFID antenna module has an RF input port 1660 operable to receive at least an RF signal.

The CS input port is electrically coupled with an optional signal separator 1661, shown in dashed lines. Recall that the CS input port and signal separator are optional, since separate RF and select signals may alternatively be used. The signal separator is operable to separate the combined signal (CS1) into an RF signal (RFD) and a select signal (SS).

The RFID antenna module also includes a decoder 1662. The signal separator is electrically coupled with the decoder. The signal separator may provide the select signal (SS) to the decoder. The decoder may be operable to generate a control signal (CTL) in response to the select signal.

The RFID antenna module also includes an input RF switch 1663. In various embodiments of the invention, the input RF switch may include one or more of a PIN (p-type/intrinsic/n-type) diode, a diode and quarter-wavelength transmission line, a field-effect transistor, and a pseudomorphic high electron mobility transistor (PHEMT). The input RF switch is electrically coupled with the input port 1660 through the intervening signal separator. The input RF switch may receive the RF signal (RFD) from the signal separator. The input RF switch is also electrically coupled with the decoder. The input RF switch may receive the control signal (CTL) from the decoder.

The input RF switch may be operable to electrically couple or not couple the RF signal to a radiative element of the RFID antenna module responsive to the control signal (CTL). In particular, the input RF switch is switchably electrically coupled with the radiative element through a first node 1664. In dependence upon the control signal (CTL), which depends on the select signal (SS), the input RF switch may be operable to electrically couple the RF signal to the first node. The radiative element may be operable to transmit an RF wave in response to receiving the RF signal.

Responsive to and/or dependent upon the control signal (CTL), the input RF switch may also be operable to electrically couple or not couple the RF signal to one or more other nodes 1666, 1667. In the particular illustrated embodiment, the one or more other nodes include a second node 1666 and an optional third node 1667. Second node 1666 has no output, and is thus essentially a dumb node. Alternatively another element, such as, for example, another radiating element, may be electrically coupled with the second node.

The optional third node is electrically coupled with an optional other element 1668. In one or more embodiments of the invention, the other element may include a non-radiative element. Examples of suitable non-radiative elements include, but are not limited to, non-radiative signal paths (see e.g., FIG. 20) and RF terminations (see e.g., FIG. 8). Alternatively, in one or more embodiments of the invention, the other element may include a second radiative element. Examples of suitable radiative elements include, but are not limited to, antennas like radiative element 1665 and radiative paths (see e.g., FIG. 23).

In one or more embodiments of the invention, the RFID antenna module may be used as the last RFID antenna module in a daisy-chain configuration or branch, such as, for example, RFID antenna module N in FIG. 3. In this application, there is no requirement for the RFID antenna module to output an RF signal or a select signal.

FIG. 17 is a block diagram of an example signal separator 1761, according to embodiments of the invention. The signal separator is essentially the reverse of the signal combiner shown in FIG. 15. The signal separator includes a node 1769. A combined signal (CS) may be provided to the node. Electrically coupled with the node are a capacitor 1770 and an inductor 1771. The capacitor and the inductor are electrically coupled in parallel. The capacitor may receive the combined signal and output an RF signal (RFD). The inductor may receive the combined signal and output a select signal (SS).

Figure 18:
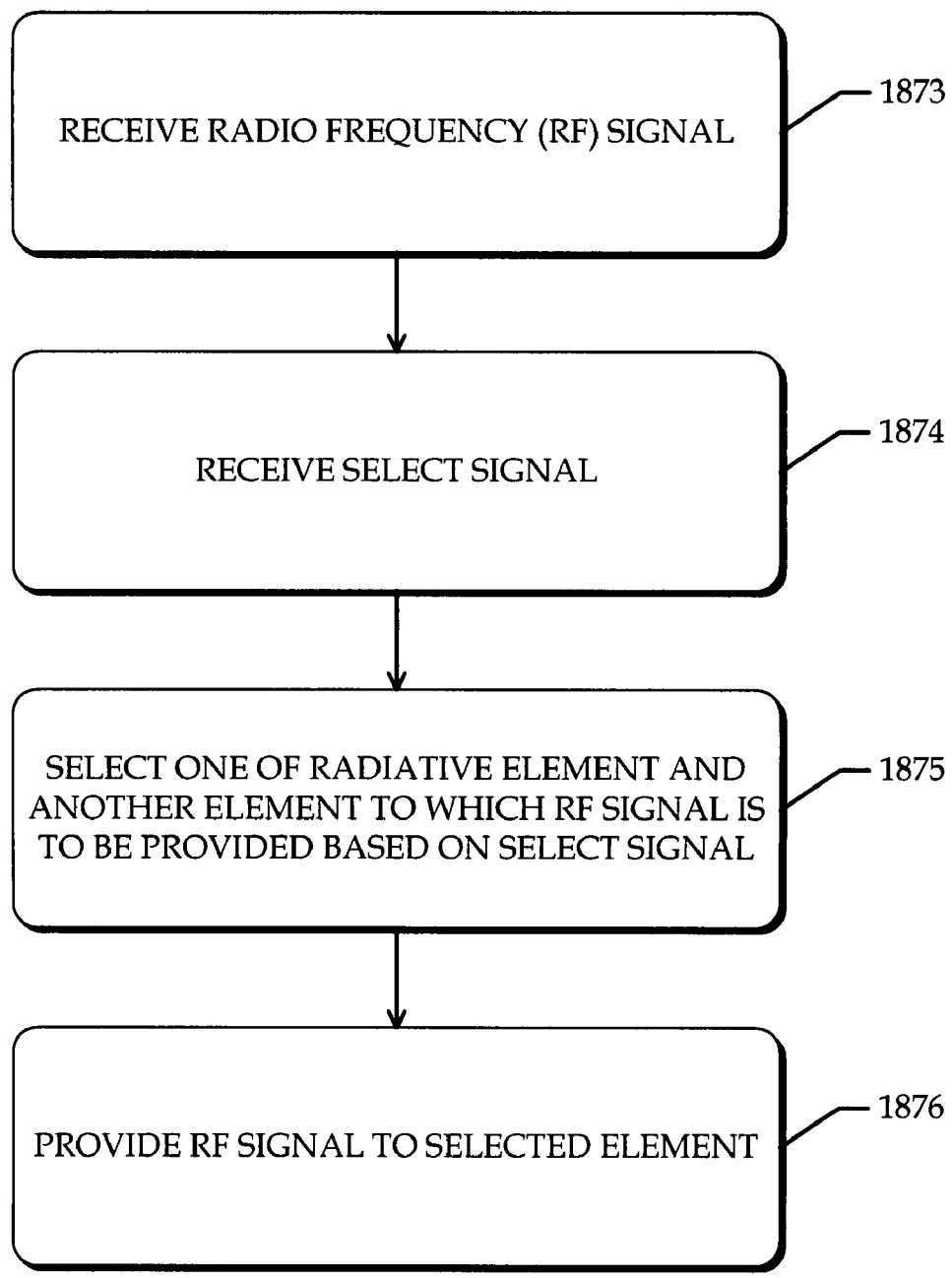
FIG. 18 is a block flow diagram of a method performed by a RFID antenna module, according to embodiments of the invention.

FIG. 18 is a block flow diagram of a method 1872 performed by a RFID antenna module, according to embodiments of the invention.

At block 1873, a radio frequency (RF) signal (RFD) may be received. At block 1874, a select signal (SS) may be received. It is to be appreciated that these signals may also be received either in the described order, in reverse order, or at least partially concurrently. For example, in one or more embodiments of the invention, a combined signal (CS) including both the RF signal (RFD) and the select signal (SS) may be received.

At block 1875, one of a radiative element and another element to which the RF signal is to be provided may be selected based on the select signal. For example, as shown in FIG. 16, input RF switch 1663 may select one of radiative element 1665 and other element 1668 in dependence upon a control signal (CTL) generated by decoder 1662 based on a select signal (SS).

Then, the RF signal may be provided to the selected element, at block 1876. For example, the RF signal may be provided through the input RF switch 1663 to either the radiative element 1665 or the other element 1668.

A particular method has been described, although the scope of the invention is not limited to this particular method. Various modifications of the method are also possible and contemplated. In one aspect, operations may optionally be added to and/or removed from the method. For example, an operation of separating a combined signal (CS) into the RF signal (RFD) and select signal (SS) may optionally be added. Other modifications of the method are possible and will be apparent to those skilled in the art and having the benefit of the present disclosure.

Figure 19A:
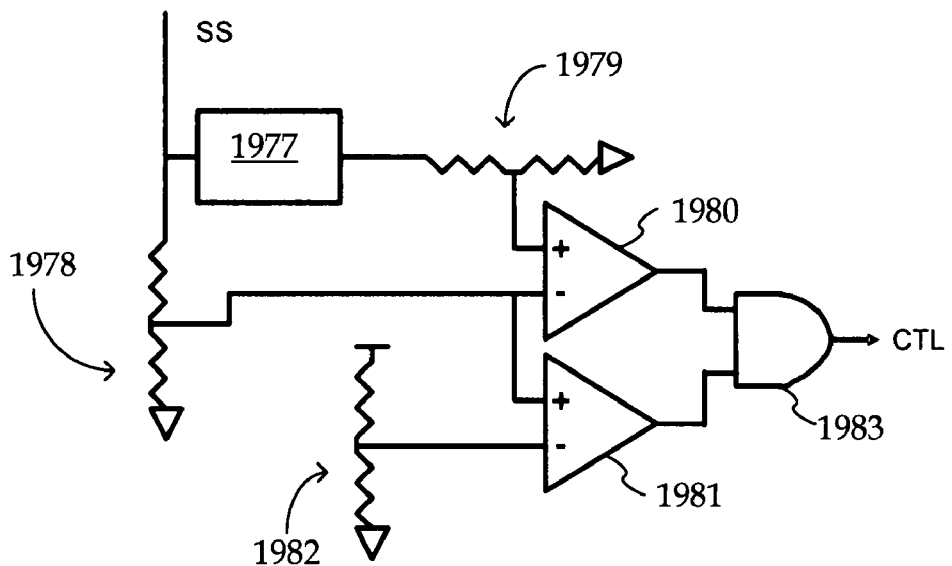
FIG. 19A is a block diagram of a particular example of a decoder, according to embodiments of the invention.

FIG. 19A is a block diagram of a particular example of a decoder, according to embodiments of the invention. A select signal (SS) is provided as input to the decoder. In embodiments of the invention, the select signal may include a variable level direct current (DC) voltage. A voltage regulator 1977 may receive the select signal. The voltage regulator may provide a reference voltage. The voltage regulator may also derive power from the select signal. This power may be provided to other power-consuming components of the decoder. The decoder also includes two comparators 1980, 1981. Each of the comparators may be set to a given level. AND gate 1983 is electrically coupled with an output of each of the two comparators. The AND gate and the comparators may represent a window comparator. A control signal (CTL) may be output from the AND gate in dependence upon and/or responsive to the voltage level of the select signal. For example, in one illustrative embodiment, if the voltage level of the select signal is within the range of the window comparator, then the decoder may output a control signal (CTL) operable to select radiative element 1665 of FIG. 16. Otherwise, a control signal (CTL) operable to select other element 1668 may be output.

Figure 19B:
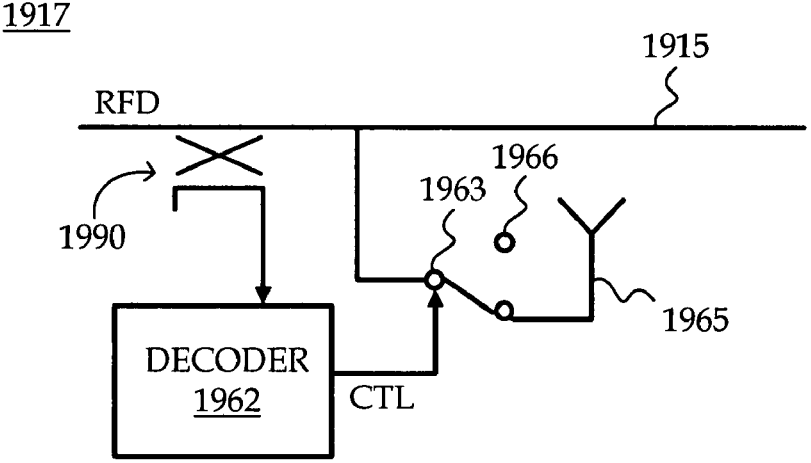
FIG. 19B is a block diagram of a RFID antenna module having a coupler to couple an RF signal with a decoder having RFID device circuitry operable to recognize a select signal (SS) modulated or encoded on an RF signal, according to embodiments of the invention.

As yet another option, the select signal (SS) may optionally be modulated or encoded on the RF signal itself. FIG. 19B is a block diagram of one example of an RFID antenna module 1917 having a coupler 1990 to couple an RF signal (RFD) with a decoder 1962 having RFID device circuitry operable to recognize a select signal (SS) modulated or encoded on an RF signal, according to embodiments of the invention. The RF signal is conveyed along a non-radiative path 1915. The coupler is coupled with the non-radiative path. The coupler is coupled with the decoder. The coupler may couple at least a version of the RF signal with the decoder.

The decoder may include RFID device circuitry. The RFID device circuitry may be similar to that found in a conventional RFID tag. The RFID device circuitry may be operable to recognize the select signal (SS) modulated or encoded on the RF signal. The decoder is electrically coupled with an input RF switch 1963 and may provide a control signal (CTL) to the input RF switch. The input RF switch may be operable to electrically couple or not couple the RF signal (RFD) received from the coupler with a radiative element 1965 or dumb node 1966 responsive to and dependent upon the control signal.

In one or more embodiments of the invention, one or more radiative characteristic of a radiative element may be configured based on the select signal. Some RFID antennas tend to exhibit relatively poor return loss. In one or more embodiments of the invention, either an RFID reader device, or an RFID antenna module, or both, may include an antenna matching or other tuning circuit. The antenna matching or tuning circuit may include antenna tuning elements that may be selected, for example with a select signal, to improve return loss and/or increase power delivered to an antenna. This may also help to reduce reflected power back to the RFID reader device. The matching circuit may be lumped, distributed, or a combination thereof.

Figure 20:
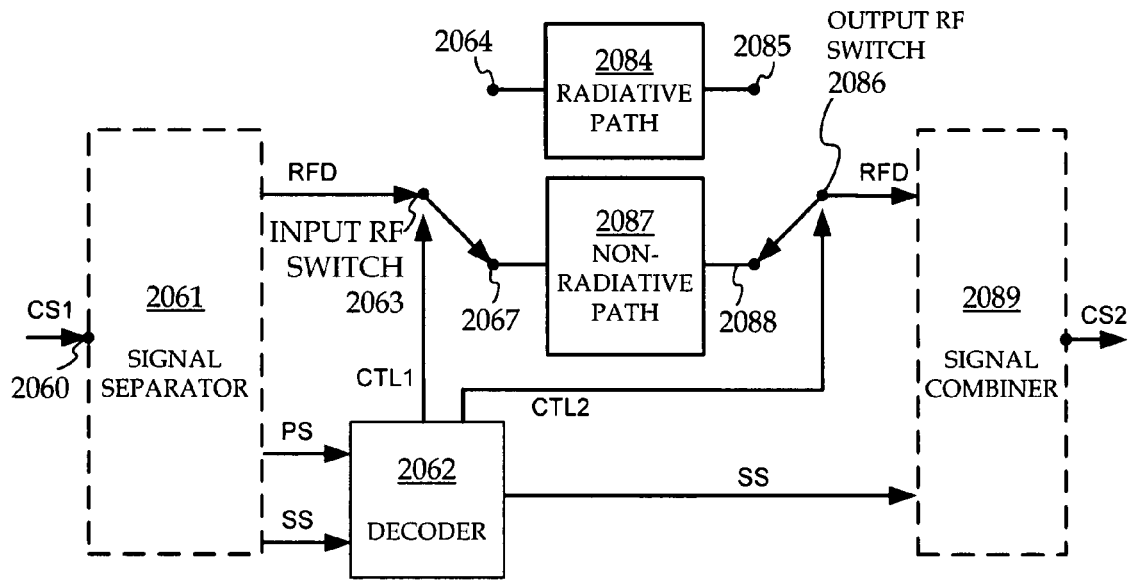
FIG. 20 is a block diagram of another example of a RFID antenna module somewhat similar to that shown in FIG. 16, except that the module includes components to convey and output a combined signal, according to embodiments of the invention.

FIG. 20 is a block diagram of another example of a RFID antenna module 2017 somewhat similar to the RFID antenna module shown in FIG. 16 except that the module of this illustration includes components to convey and output a combined signal (CS2), according to embodiments of the invention.

The RFID antenna module includes a CS input port 2160, an optional signal separator 2161, a decoder 2162, an input RF switch 2163, a first node 2164, and a second node 2167. The signal separator may include a rectifier or other device (not shown) capable of generating power (PS) from the combined signal that may be provided to the decoder. Otherwise, unless otherwise specified, these components may optionally have some or all of the characteristics of the correspondingly named components of the RFID antenna module shown in FIG. 16. To avoid obscuring certain concepts, the following description will focus primarily on the different and/or additional structures and characteristics of the RFID antenna module 2017 of FIG. 20.

The RFID antenna module includes a radiative path 2084 and a non-radiative path 2087. These paths are switchably electrically coupled with the input RF switch 2063 similarly to the radiative element 1665 and the other element 1668 of FIG. 16. The radiative path has two capabilities. One is to radiate or transmit an RF wave responsive to receiving an RF signal. Another is to convey the RF signal and provide at least a version of the RF signal as an output at the end of the path. The non-radiative path may convey and output at least a version of the RF signal without radiating.

The RFID antenna module also includes an output RF switch. The output RF switch is electrically coupled with the decoder. The decoder may provide a first control signal (CTL1) to the input RF switch and a potentially different second control signal (CTL2) to the output RF switch. In one aspect, the first and second control signals may configure both the input RF switch and the output RF switch to select either the radiative path or the non-radiative path. The output RF switch may receive the version of the RF signal (RFD) from the selected path. In another aspect, the first control signal may configure the input RF switch to select the radiative path, while the second control signal may configure the output RF switch not to select the radiative path. As a result, the radiative path may radiate without conveying the RF signal as output from the antenna module through the output RF switch.

The output RF switch is electrically coupled with an optional signal combiner 2089. The signal combiner is optional because separate RF and select signals may optionally be used. The signal combiner may receive a version of the RF signal (RFD) from the output RF switch. The signal combiner is also electrically coupled with the decoder. The signal combiner may receive a version of the select signal (SS) from the decoder. The signal combiner may combine the received RF signal (RFD) and select signal (SS) into a combined signal (CS2). The combined signal (CS2) may be output from the RFID antenna module through a CS output port. As previously discussed, the CS output port may be considered an RF signal output port and a SS output port.

The RF signal tends to weaken as it is propagated from one antenna module to another. In one or more embodiments of the invention, an RFID reader system may optionally include one or more power amplifiers to amplify the RF signal propagated through the antenna modules. The power amplifiers may be included in various different locations. For example, a power amplifier may be included at various different locations within an antenna module. By way of example, in FIG. 20, the power amplifier may be located in either or both of the paths 2084, 2087, or before or after either or both of the paths. For example, the power amplifier may be located either between the signal separator and the input RF switch, or between the output RF switch and the signal combiner, or in both places. Alternatively, a power amplifier may be located on a coaxial cable or other link coupling antenna modules. The power amplifier may be powered either by the RF signal itself, by the power signal (PS), or by an external source of power.

Figure 21:
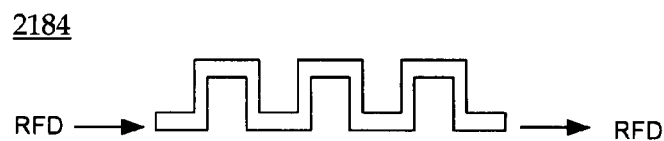
FIG. 21 is a block diagram of an example of a radiative path, according to embodiments of the invention.

FIG. 21 is a block diagram of an example of a radiative path 2184, according to embodiments of the invention. The radiative path may receive an RF signal (RFD), radiate or transmit an RF wave responsive to receiving the RF signal, and output at least a version of the received RF signal (RFD). Various unshielded conductors are suitable for the radiative path.

Figure 22:
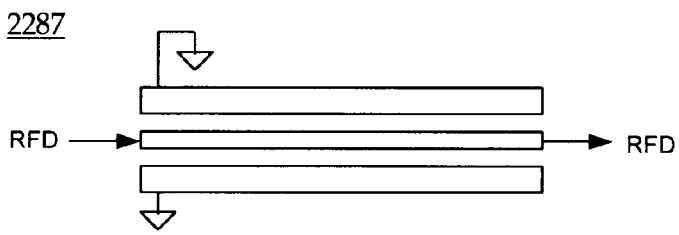
FIG. 22 is a block diagram of an example of a non-radiative path, according to embodiments of the invention.

FIG. 22 is a block diagram of an example of a non-radiative path 2287, according to embodiments of the invention. The radiative path may receive an RF signal (RFD), convey the RF signal without radiating, and output at least a version of the received RF signal (RFD). Examples of suitable non-radiative paths include, but are not limited to, coaxial cables, shielded signal paths, shielded by-pass transmission lines, and other paths capable of conveying RF signals without radiating.

Figure 23:
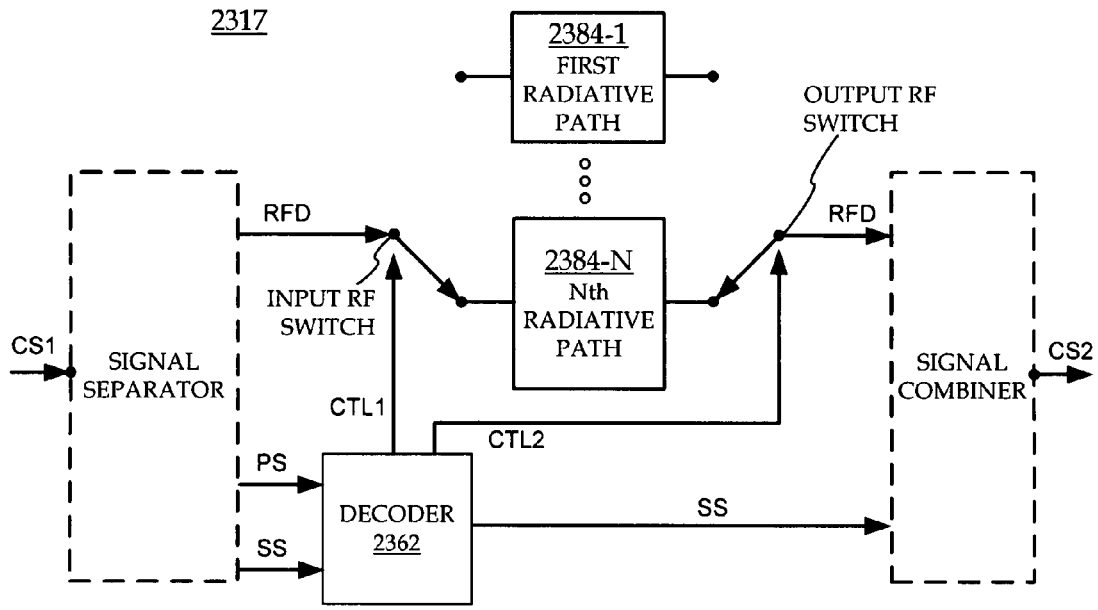
FIG. 23 is a block diagram of yet another example of a RFID antenna module similar to that shown in FIG. 20 except that the module includes multiple radiative paths and an input RF switch that is operable to electrically couple the RF signal to either of the radiative paths responsive to a control signal from a decoder, according to embodiments of the invention.

FIG. 23 is a block diagram of yet another example of a RFID antenna module 2317 similar to that shown in FIG. 20 except that the module includes multiple radiative paths 2384-1 through 2384-N, according to embodiments of the invention. As shown, a first radiative path 2384-1 is electrically coupled in place of the radiative path 2084 of FIG. 20. An Nth radiative path 2384-N is electrically coupled in place of the non-radiative path 2087 of FIG. 20. Other optional radiative paths may optionally similarly be included. The input and output RF switches may receive respective potentially different first and second control signals (CTL1, CTL2), which are operable to configure each of the switches to select usually but not always the same radiative path, as previously described.

Different applications of the multiple radiative paths are contemplated. In one or more embodiments of the invention, two or more smaller near field antennas may be used instead of one larger near field antenna. The two smaller near field antennas may potentially generate a larger magnetic field than the larger near field antenna. In one or more other embodiments of the invention, the multiple radiative paths may be controlled to provide antenna diversity, such as, for example, polarization diversity or spatial diversity.

Figure 24:
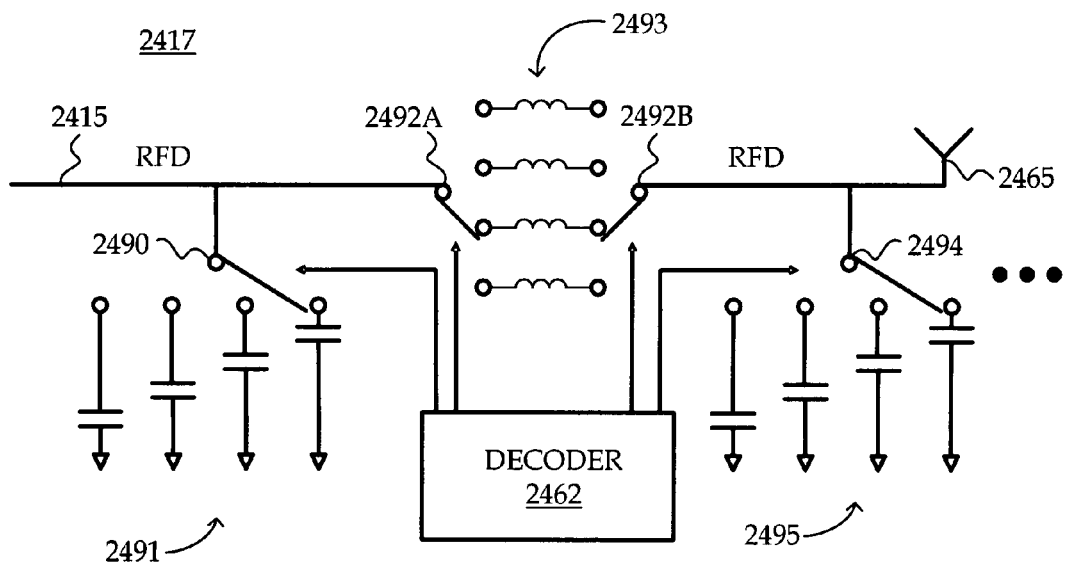
FIG. 24 is a block diagram of an example of a configurable antenna tuning circuit configurable by a select signal through selection of antenna tuning elements, according to embodiments of the invention.

FIG. 24 is a block diagram of a first example of a configurable antenna tuning circuit configurable by a select signal through selection of antenna tuning elements, according to embodiments of the invention.

The circuit includes a non-radiating path 2415. An RF signal (RFD) may be conveyed along the path towards an antenna or other radiating element 2465.

The circuit also includes a first switch 2490, a second switch 2494, a third switch 2492A, and a fourth switch 2492B. The first switch is operable to select among a plurality of different capacitors 2491, representing antenna tuning elements. Similarly, the fourth switch is operable to select among a plurality of different capacitors 2495. The second and third switches are operable to select among a plurality of different inductors 2493. The capacitors and inductors are examples of antenna tuning elements.

The circuit also includes a decoder 2462. The decoder may issue control signals. The control signals may control the selection of the different antenna tuning elements by the switches. By selecting the different antenna tuning elements, antenna matching or other tuning may be achieved to improve the radiative aspects of the radiative element in some way.

Other ways of configuring the radiative characteristic of the radiative element based on the select signal are also contemplated. For example, phase shifts of one or more antennas may be selected based on the select signal, such as, for example, to perform antenna beam steering.

Figure 25:
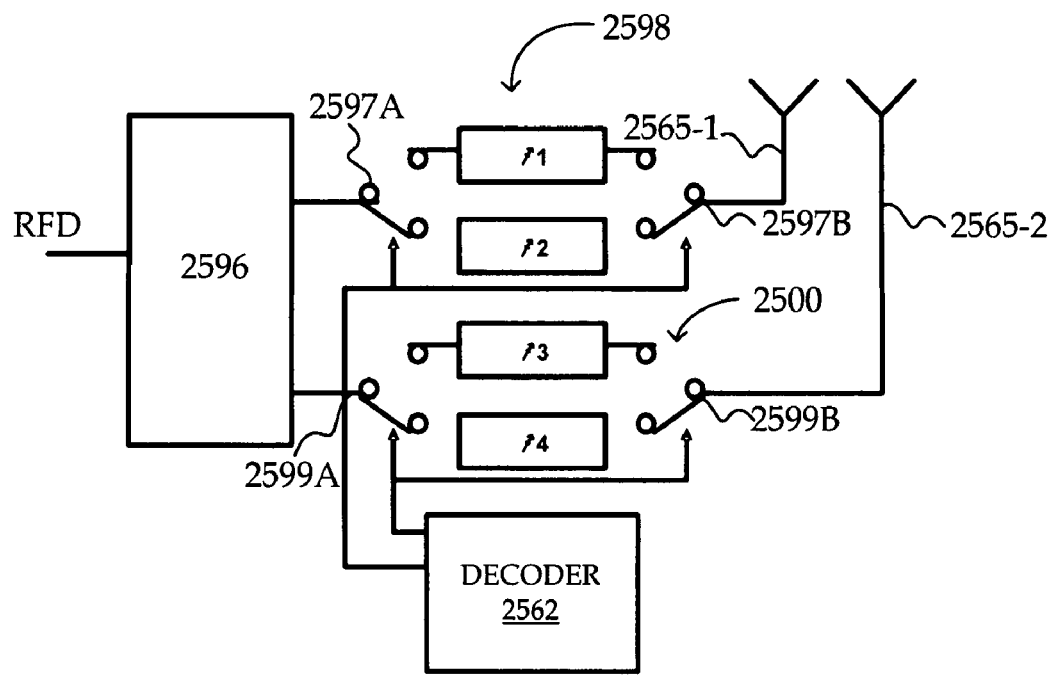
FIG. 25 is a block diagram of a second example of a configurable antenna tuning circuit configurable by a select signal through selection of antenna tuning elements, according to embodiments of the invention.

FIG. 25 is a block diagram of a second example of a configurable antenna tuning circuit configurable by a select signal through selection of antenna tuning elements, according to embodiments of the invention. The circuit includes a power divider 2596. The power divider may receive an RF signal (RFD). Versions of the RF signal may be provided to each of a first switch 2597A and a second switch 2599A. The first switch, along with a third switch 2597B, are operable to select one of a first plurality of phase delay or changing elements 2598. The second switch, along with a fourth switch 2599B, are operable to select one of a second plurality of phase delay or changing elements 2500. A decoder 2562 may provide control signals to the switches to control the selections.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description.

It will also be appreciated, by one skilled in the art, that modifications may be made to the embodiments disclosed herein, such as, for example, to the configurations, forms, functions, and manner of operation, and assembly and use, of the components of the embodiments. All equivalent relationships to those illustrated in the drawings and described in the specification are encompassed within embodiments of the invention.

Where considered appropriate, reference numerals or terminal portions of reference numerals have been repeated among the figures to indicate the same or corresponding elements, respectively. Unless specified otherwise, the corresponding elements may optionally have similar characteristics.

Certain operations may be performed by hardware components, or may be embodied in machine-executable instructions, that may be used to cause, or at least result in, a circuit programmed with the instructions performing the operations. The circuit may include a general-purpose or special-purpose processor, or logic circuit, to name just a few examples. The operations may also optionally be performed by a combination of hardware and software.

For clarity, in the claims, any element that does not explicitly state "means for" performing a specified function, or "step for" performing a specified function, is not to be interpreted as a "means" or "step" clause as specified in 35 U.S.C. Section 112, Paragraph 6. In particular, any potential use of "step of" in the claims herein is not intended to invoke the provisions of 35 U.S.C. Section 112, Paragraph 6.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, FIG., or description thereof for the purpose of streamlining the disclosure and aiding in the understanding of various inventive aspects.

This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A radio frequency identification (RFID) reader device comprising:
   a radio frequency (RF) output port operable to allow a plurality of RFID antenna modules that are electrically coupled together to be coupled with the RFID reader device;
   a RF signal generator coupled with the RF output port, the RF signal generator operable to generate an RF signal for transmission by one of the plurality of RFID antenna modules;
   a select signal generator coupled with the RF output port, the select signal generator operable to generate a select signal for selecting one of the plurality of RFID antenna modules;
   a signal combiner coupled with the RF signal generator, the select signal generator, and the RF output port, the signal combiner operable to combine the RF signal and the select signal into a combined signal and provide the combined signal to the RF output port for both selecting an RFID antenna module and providing the RF signal to be transmitted by the selected RFID antenna module; and
   a signal separator in each of the plurality of RFID antenna modules, for separating the select signal from the RF signal prior to transmission.

2. The device of claim 1, in which the select signal is to be output at a different time than the RF signal.

3. The device of claim 1, further comprising an RF termination to receive and terminate a return RF signal derived from the RF signal provided to the output port.

4. The device of claim 3, further comprising an RF return port operable to be coupled with an RFID antenna module of the plurality and coupled with the RF termination to provide the return RF signal to the RF termination.

5. The device of claim 1, in which the select signal generator comprises a digital to analog converter.

6. The device of claim 1, in which the select signal generator is operable to generate a select signal that is operable to select multiple RFID antenna modules at a time.

7. The device of claim 1, in which the select signal is operable to select among more RFID antenna modules than there are RF output ports on the RFID reader device.

8. The device of claim 1, in which the signal separator comprises a rectifier operable to generate a direct current power signal from the RF signal and provide the direct current power signal to the decoder to power the decoder.

9. A method performed by a radio frequency identification (RFID) reader device comprising:
   generating a radio frequency (RF) signal for transmission by one of the plurality of RFID antenna modules;
   generating a select signal that is operable to:
      select at least one RFID antenna module of the plurality to transmit an RF wave,
   combining the RF signal and the select signal into a combined signal;
   outputting the combined signal to an RF output port to which the plurality of RFID antenna modules are coupled that is operable to:
      select an RFID antenna module and provide the RF signal to be transmitted by the selected RFID antenna module; and
   separating the select signal from the RF signal prior to transmission of the RF signal.

10. The method of claim 9, in which outputting the select signal and outputting the RF signal comprises outputting the select and RF signals at different times.

11. The method of claim 9, further comprising terminating a return RF signal derived from the output RF signal.

12. The method of claim 9, in which generating the select signal comprises generating the select signal that is operable to select multiple RFID antenna modules of the plurality.

13. The method of claim 9, in which the select signal is operable to select among a greater number of RFID antenna modules than there are RF output ports on the RFID reader device.

14. The method of claim 9, further comprising receiving a RF response from an RFID tag responsive to transmission of the RF wave.

* * * * *

UNITED STATES PATENT AND TRADEMARK OFFICE
CERTIFICATE OF CORRECTION

| | | |
|---|---|---|
| PATENT NO. | : 7,973,645 B1 | |
| APPLICATION NO. | : 11/807115 | |
| DATED | : July 5, 2011 | |
| INVENTOR(S) | : Moretti et al. | |

It is certified that error appears in the above-identified patent and that said Letters Patent is hereby corrected as shown below:

Title Page; item (56);
1) Please delete "semiconductor,agilent.com." on page 1, column 2, line 5 and insert -- semiconductor.agilent.com. --, therefor.

2) Please delete "(not shown)" on column 12, line 65 and insert -- (not shown). --, therefor.

Signed and Sealed this
Thirteenth Day of September, 2011

David J. Kappos
*Director of the United States Patent and Trademark Office*